United States Patent
Bickham et al.

(10) Patent No.: US 8,297,854 B2
(45) Date of Patent: Oct. 30, 2012

(54) MULTIMODE FIBER OPTIC ASSEMBLIES

(75) Inventors: Scott Robertson Bickham, Corning, NY (US); Radawan Hall, Granite Falls, NC (US); James Phillip Luther, Hickory, NC (US); Daiping Ma, Wilmington, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/207,816

(22) Filed: Aug. 11, 2011

(65) Prior Publication Data

US 2011/0305420 A1     Dec. 15, 2011

Related U.S. Application Data

(63) Continuation of application No. PCT/US2010/024051, filed on Feb. 12, 2010.

(60) Provisional application No. 61/152,676, filed on Feb. 14, 2009.

(51) Int. Cl.
*G02B 6/36* (2006.01)
*G02B 6/02* (2006.01)

(52) U.S. Cl. ............ 385/78; 385/53; 385/60; 385/72; 385/123; 385/124; 385/140

(58) Field of Classification Search ............ 385/53–94, 385/100, 123, 124, 140
See application file for complete search history.

(56) References Cited

U.S. PATENT DOCUMENTS

| 6,801,695 | B2 * | 10/2004 | Lanier et al. | 385/100 |
| 6,876,807 | B2 * | 4/2005 | Lanier et al. | 385/128 |
| 2008/0166094 | A1 * | 7/2008 | Bookbinder et al. | 385/124 |
| 2011/0262076 | A1 * | 10/2011 | Hall et al. | 385/78 |

OTHER PUBLICATIONS

Naoya Nishimura, et al., High-Density Multi-Fiber Connectors for Optical Interconnection, Furukawa Review 2008, Furukawa Electric Co. Ltd. Japan, vol. 34, pp. 13-16, XP002608826.
Toshiaki Satake, et at., MT Multifiber Connectors and New Applications, Proceedings of the Electronic Components and Technology Conference, Washington, May 1-4, 1994, pp. 994-999.
T.Y. Lin, et al., Design considerations for multi-fiber ferrule manufacturing, Optical Fiber Technology, vol. 12, No. 3, pp. 255-261, XP024917335.

* cited by examiner

*Primary Examiner* — Brian M. Healy
*Assistant Examiner* — Guy Anderson
(74) *Attorney, Agent, or Firm* — Christopher Paul Lewallen

(57) ABSTRACT

Fiber optic assemblies including at least one multimode optical fiber that have improved performance are disclosed. In one embodiment, at least one connector is mounted upon and end of at least one multimode optical fiber and the assembly has an insertion loss of about 0.04 dB or less at a reference wavelength of 850 nanometers. Another embodiment is directed to a fiber optic assembly having a plurality of multimode optical fibers attached to a multifiber ferrule. The multifiber ferrule has a pair of guide pin bores having a nominal diameter, wherein the guide pin bores have a tolerance of ±0.0005 millimeters from a nominal diameter for improving performance.

35 Claims, 20 Drawing Sheets

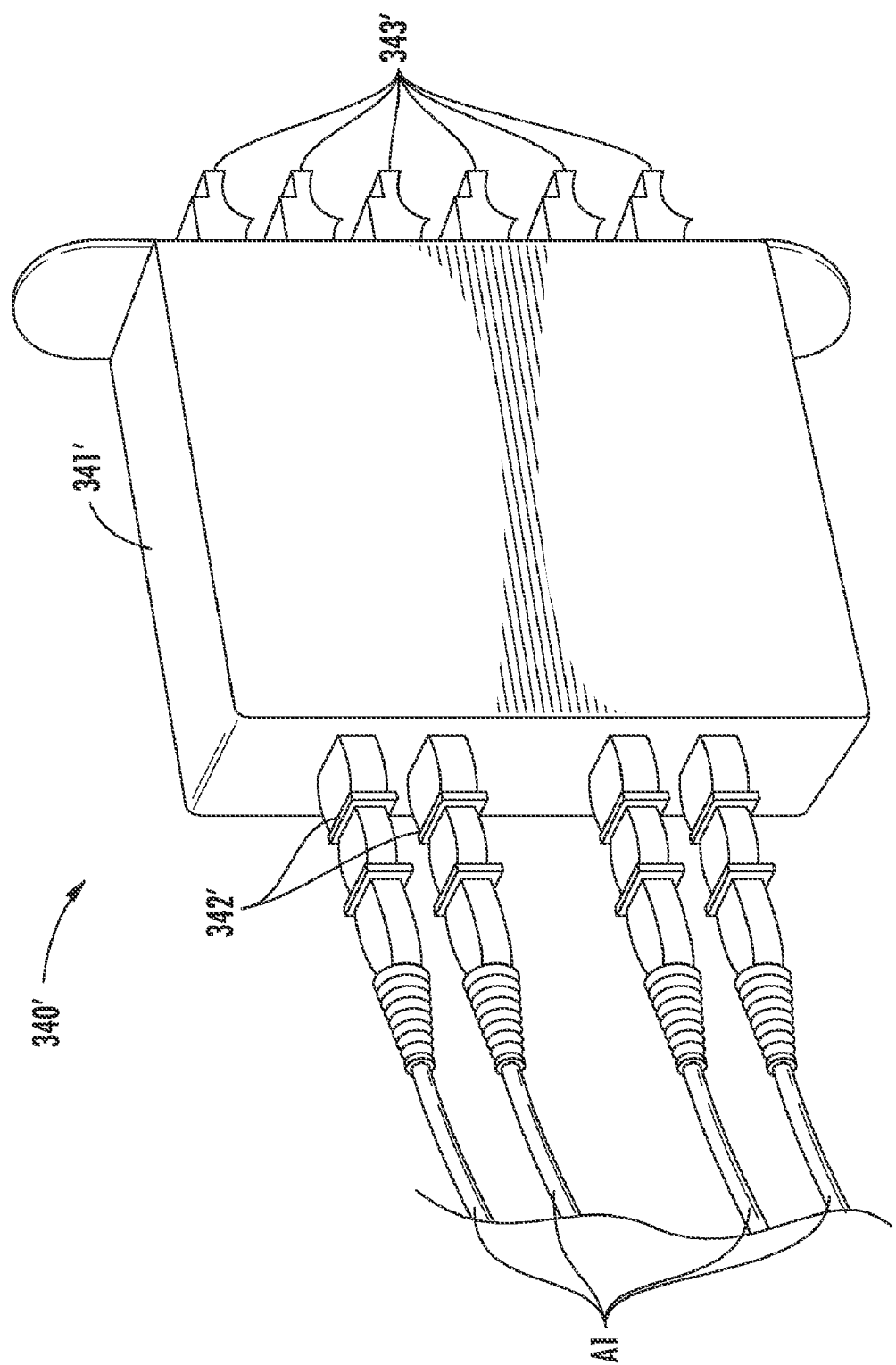

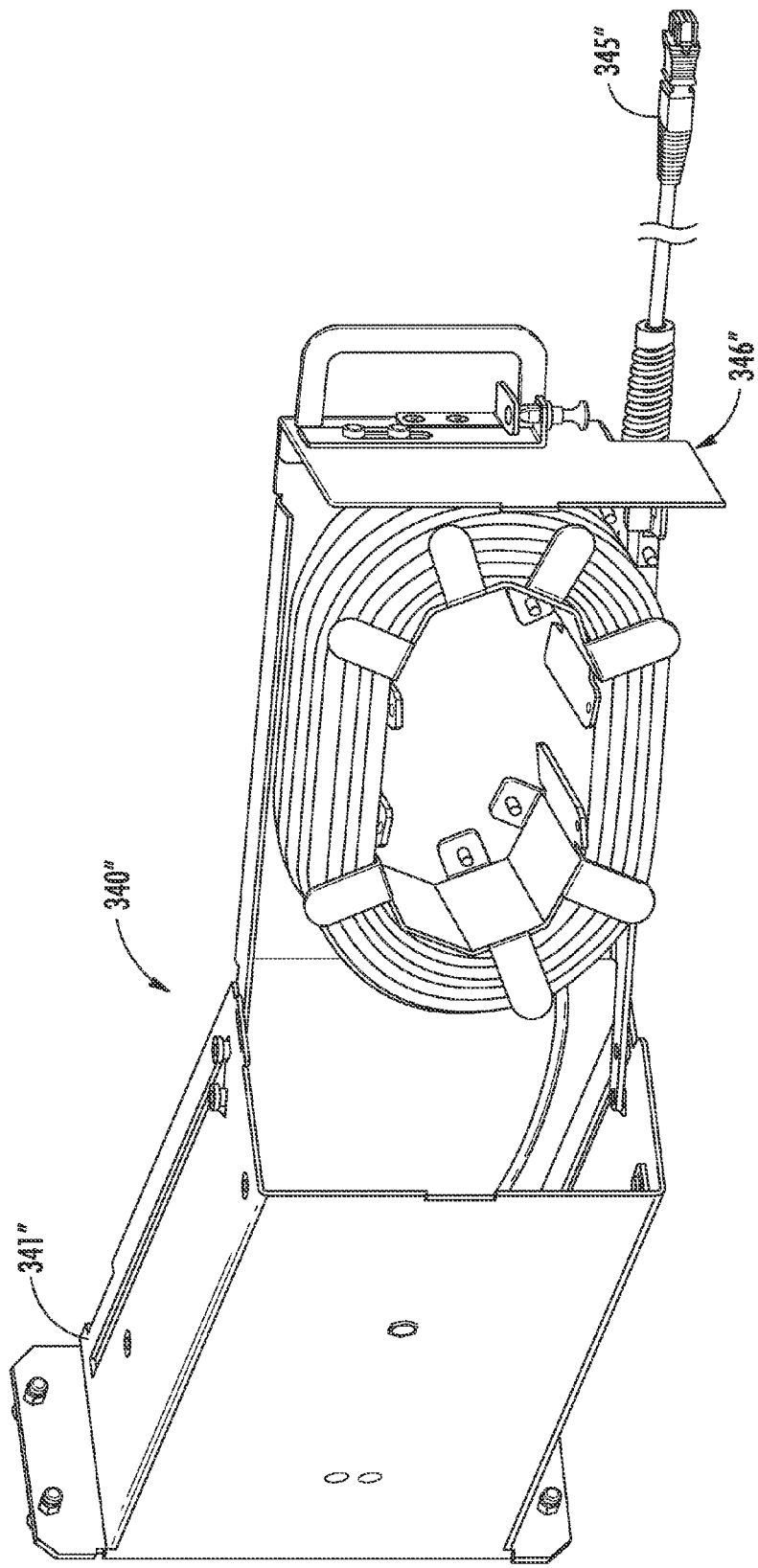

10mm DIAMETER MANDREL

20mm DIAMETER MANDREL

40mm DIAMETER MANDREL

MULTIMODE FIBER OPTIC ASSEMBLIES

RELATED APPLICATIONS

This application is a continuation of International Application No. PCT/US10/24051 filed Feb. 12, 2010, which claims the benefit of priority to U.S. Application No. 61/152,676, filed Feb. 14, 2009, both applications being incorporated herein by reference.

BACKGROUND

The present disclosure relates generally to fiber optic assemblies having multimode optical fiber. By way of example, the disclosure is related to assemblies such as optical fiber pigtails and jumpers having at least one high-performance multimode optical fiber, thereby enabling previously unattainable optical performance.

With the increase in the deployment of optical networks such as data centers, a need has arisen for increasing the performance, manageability, handleability and flexibility of fiber optic assemblies such as cables, cable assemblies and network components in general. Unlike long-haul applications, data centers and the like typically use a multimode optical fiber instead of single-mode optical fiber. Due to its relatively large core, multimode optical fiber is more sensitive to events that cause optical attenuation compared with single-mode optical fiber, which has a smaller core. It would be desirable to develop multimode assemblies and components that perform better, are more tolerant and robust to rugged installations, thus saving time and costs while improving optical performance.

Conventional cables, cable assemblies, fiber optic hardware and other network components typically define structure that accommodates, and is in part, limited by the physical characteristics of the space. In other words, it is oftentimes the case that the physical and performance limitations of the assemblies, hardware, routing, etc. partly define assembly structure and processes associated with designing and installing optical networks. For instance, the optical network designer must design the optical network to maintain optical performance with an acceptable budget loss for the same.

SUMMARY

Disclosed are various embodiments of fiber optic cables, jumpers and other assemblies having multimode optical fiber in at least a portion thereof. The multimode fiber optic assemblies provide improved performance of the assemblies in fiber optic cables, fiber optic hardware and other assemblies, where the physical and performance characteristics of the assemblies lends itself to characteristics such as tighter bend radius tolerances without degraded performance and relaxing fiber routing and handling requirements. For instance, the fiber optic pigtails, jumpers, cables, modules, and the like allow for improvement in loss budgets for optical networks. Additionally, aggressive installations techniques not previously possible with conventional multimode fiber optic assemblies are possible while still preserving optical performance for the different modes being transmitted.

The bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

Additional features and advantages will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments, and are intended to provide an overview or framework for understanding the nature and character of the same. The accompanying drawings are included to provide a further understanding, and are incorporated into and constitute a part of this specification. The drawings illustrate various embodiments, and together with the detailed description, serve to explain the principles and operations thereof.

BRIEF DESCRIPTION OF THE DRAWINGS

FIGS. 14a-14d depict explanatory modules that include a multimode fiber optic assembly;

DETAILED DESCRIPTION

The embodiments will now be described more fully hereinafter with reference to the accompanying drawings in which exemplary embodiments are shown. However, practice of the disclosure may be embodied in many different forms and should not be construed as limited to the embodiments set forth herein. These exemplary embodiments are provided so that this disclosure will be both thorough and complete, and will fully convey the scope of the claims and enable one of ordinary skill in the art to make, use and practice the same. Like reference numbers refer to like elements throughout the various drawings.

Disclosed are multimode fiber optic assemblies having macro-bend resistant optical fibers. The multimode assemblies are advantageous since they preserve and provide optical performance that was not attainable with conventional multimode fiber optic assemblies. Multimode fiber optic assemblies disclosed herein provide stability for higher order modes that are unstable even in short lengths. Generally speaking, the higher order modes transmitted by multimode optical fiber assemblies are more sensitive to macro-bending and/or other pertubations. For instance, the multimode fiber optic assemblies disclosed provide improved performance compared with conventional multimode fiber optic assemblies. Consequently, multimode assemblies disclosed herein allow aggressive bending for installation, routing, slack storage, higher density and the like, thereby allowing rugged installations both by the craft and untrained individuals. Multimode fiber optic assemblies (i.e., assemblies) include multimode fiber optic ribbons, fiber optic jumpers such as single or duplex jumpers and higher fiber count jumper assemblies, modules, fiber optic pigtails, assemblies having one or more hardened connectors, and the like.

Figure 1:
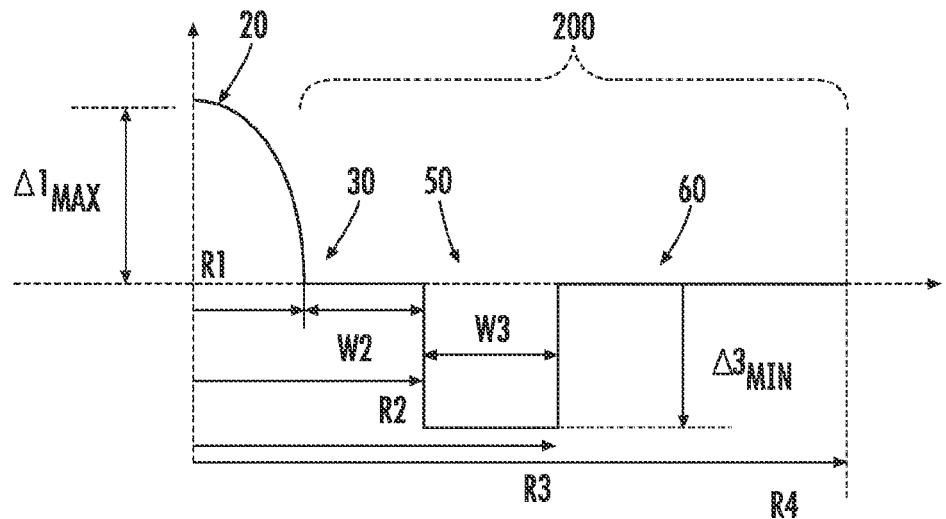
FIG. 1 shows a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 2:
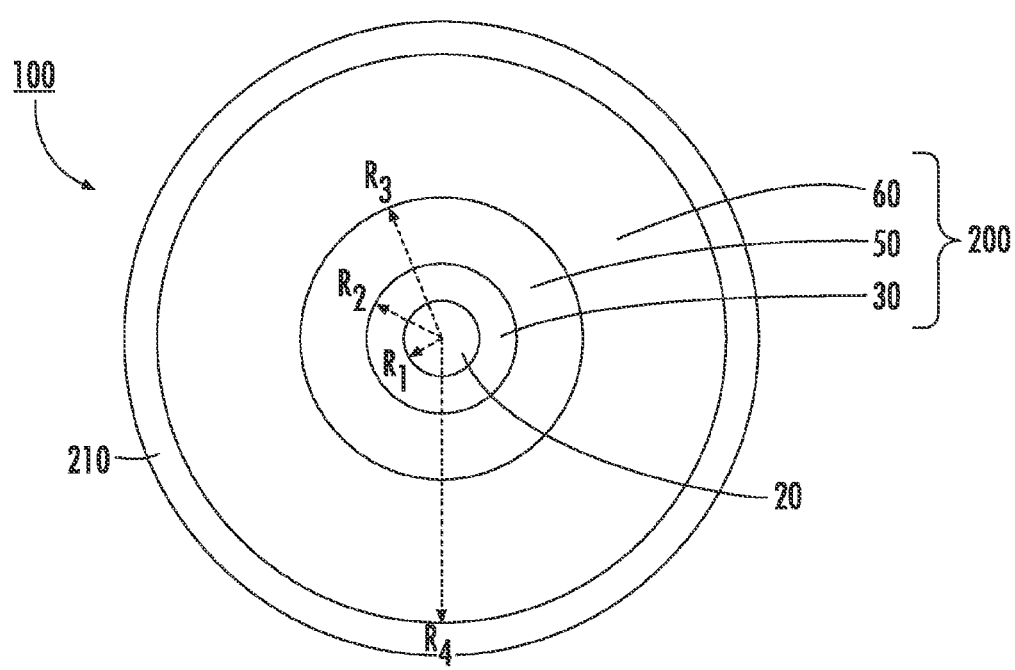
FIG. 2 is a schematic representation (not to scale) of a cross-sectional view of the optical waveguide fiber of FIG. 1.

FIG. 1 shows a schematic representation of the refractive index profile of a cross-section of the glass portion of an embodiment of a multimode optical fiber 100 comprising a glass core 20 and a glass cladding 200, the cladding comprising an inner annular portion 30, a depressed-index annular portion 50, and an outer annular portion 60. FIG. 2 is a schematic representation (not to scale) of a cross-sectional view of the optical waveguide fiber of FIG. 1. The core 20 has outer radius R1 and maximum refractive index delta $\Delta 1$ MAX. The inner annular portion 30 has width W2 and outer radius R2. Depressed-index annular portion 50 has minimum refractive index delta percent $\Delta 3$ MIN, width W3 and outer radius R3. The depressed-index annular portion 50 is shown offset, or spaced away, from the core 20 by the inner annular portion 30. The annular portion 50 surrounds and contacts the inner annular portion 30. The outer annular portion 60 surrounds and contacts the annular portion 50. The clad layer 200 is surrounded by at least one coating 210, which may in some embodiments comprise a low modulus primary coating and a high modulus secondary coating.

The inner annular portion 30 has a refractive index profile $\Delta 2(r)$ with a maximum relative refractive index $\Delta 2$ MAX, and a minimum relative refractive index $\Delta 2$ MIN, where in some embodiments $\Delta 2$ MAX=$\Delta 2$ MIN. The depressed-index annular portion 50 has a refractive index profile $\Delta 3(r)$ with a minimum relative refractive index $\Delta 3$ MIN. The outer annular portion 60 has a refractive index profile $\Delta 4(r)$ with a maximum relative refractive index $\Delta 4$ MAX, and a minimum relative refractive index $\Delta 4$ MIN, where in some embodiments $\Delta 4$ MAX=$\Delta 4$ MIN. Preferably, $\Delta 1$ MAX>$\Delta 2$ MAX>$\Delta 3$ MIN. In some embodiments, the inner annular portion 30 has a substantially constant refractive index profile, as shown in FIG. 1 with a constant $\Delta 2(r)$; in some of these embodiments, $\Delta 2(r)$=0%. In some embodiments, the outer annular portion 60 has a substantially constant refractive index profile, as shown in FIG. 1 with a constant $\Delta 4(r)$; in some of these embodiments, $\Delta 4(r)$=0%. The core 20 has an entirely positive refractive index profile, where $\Delta 1(r)$>0%. R1 is defined as the radius at which the refractive index delta of the core first reaches value of 0.05%, going radially outwardly from the centerline. Preferably, the core 20 contains substantially no fluorine, and more preferably the core 20 contains no fluorine. In some embodiments, the inner annular portion 30 preferably has a relative refractive index profile $\Delta 2(r)$ having a maximum absolute magnitude less than 0.05%, and $\Delta 2$ MAX<0.05% and $\Delta 2$ MIN>−0.05%, and the depressed-index annular portion 50 begins where the relative refractive index of the cladding first reaches a value of less than −0.05%, going radially outwardly from the centerline. In some embodiments, the outer annular portion 60 has a relative refractive index profile $\Delta 4(r)$ having a maximum absolute magnitude less than 0.05%, and $\Delta 4$ MAX<0.05% and $\Delta 4$ MIN>−0.05%, and the depressed-index annular portion 50 ends where the relative refractive index of the cladding first reaches a value of greater than −0.05%, going radially outwardly from the radius where $\Delta 3$ MIN is found.

The bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

In some embodiments, the bend resistant multimode optical fibers comprise a cladding with voids, the voids in some preferred embodiments are non-periodically located within the depressed-index annular portion. "Non-periodically located" means that if takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture (NA) of greater than 0.14, more preferably greater than 0.17, even more preferably greater than 0.18, and most preferably greater than 0.185, and an overfilled bandwidth greater than 1.5 GHz-km at 850 nm. By way of example, the numerical aperture for the multimode optical fiber 100 is between about 0.185 and about 0.215.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. By way of example, these high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the core extends radially outwardly from the centerline to a radius R1, wherein $10 \leq R1 \leq 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm. Optical fiber 100 is also disclosed in U.S. patent application Ser. Nos. 12/250,987 filed on Oct. 14, 2008 and 12/333,833 filed on Dec. 12, 2008, the disclosures of which are incorporated herein by reference.

FIGS. 3-13 are various views of explanatory multimode fiber optical assemblies using optical fiber 100. FIGS. 3-13 respectively depict a fiber optic ribbon, single fiber optic cables, a multi-fiber optic cable such as the MIC® family of cables available from Corning Cable Systems of Hickory, N.C., a micromodule fiber optic cable, a ribbon fiber optic cable, fiber optic pigtails, and fiber optic jumper cables. Of course, optical fiber 100 may be used in any other suitable multimode fiber optic assemblies such as assemblies having preconnectorized assemblies such as trunk cables, assemblies with furcated legs, feeder cables, slotted core cables, hybrid cables (i.e., having electrical conductors and optical fibers 100), drop cables, etc. Likewise, the assemblies disclosed can have any suitable connector(s) on one or more ends. By way of example, the multimode fiber optic assemblies described herein maybe installed within fiber optic hardware such as patch panels, cross-connect frames, modules and the like. Multimode fiber optic assemblies disclosed have low insertion loss and/or preserve optical attenuation during, for example, macrobending down to levels not previously attainable with previous multimode fiber optic assemblies. Any of the multimode fiber optic assemblies can have the performance discussed herein.

Figure 3:
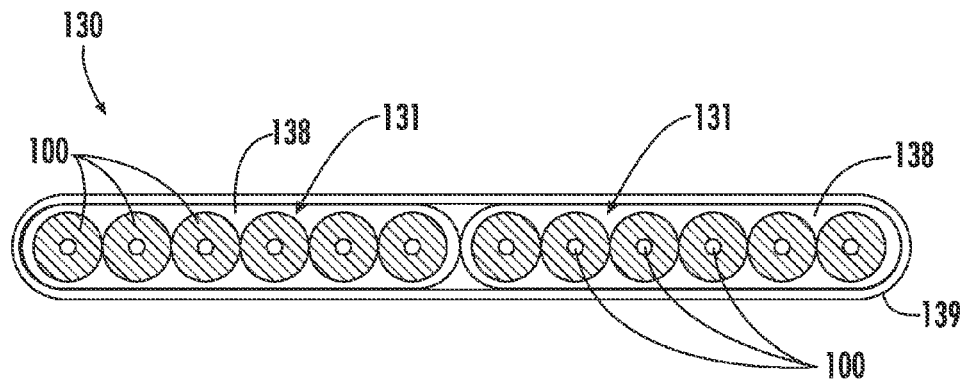
FIGS. 3-13 are various views of multimode fiber optic assemblies using the multimode optical fiber of FIGS. 1 and 2.

FIG. 3 is a cross-sectional view of a multimode fiber optic assembly 130. Multimode fiber optic assembly 130 is a fiber optic ribbon having a plurality of multimode optical fibers 100 connected together by a protective covering 138 such as a matrix material as known in the art. As depicted, multimode fiber optic assembly 130 is a sub-unit design with two ribbons sub-units 131 having respective protective coverings 138 connected with a secondary matrix 139, but other ribbon designs are possible.

Figure 4:
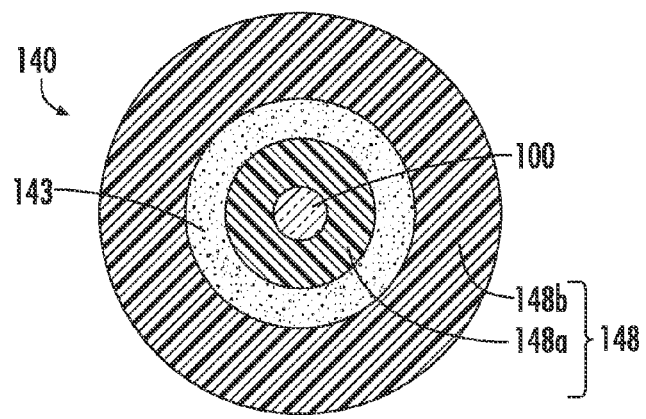

FIG. 4 depicts a cross-sectional view of a multimode fiber optic assembly 140 having a single optical fiber 100. Multimode fiber optic assembly 140 may be referred to as a simplex fiber optic cable since it only has one optical fiber. Generally speaking, optical fiber 100 is maintained within at least one protective covering such as a buffer layer and/or a jacket. As shown, multimode fiber optic assembly 140 has a protective covering 148 that includes a buffer layer 148a disposed about optical fiber 100 and an optional jacket 148b. Additionally, multimode fiber optic assembly 140 also includes a plurality of optional strength members 143 disposed between buffer layer 148a and jacket 148b. Buffer layer 148a may be any suitable material such as a polymer like PVC or UV curable material. Moreover, buffer 148a may upcoat multimode optical fiber 100 to any suitable dimension such as 500 microns, 700 microns, 900 microns, or other desired dimension. Moreover, a multimode fiber optic assembly may merely be the optical fiber 100 having the buffer layer without strength members and jacket or a bare optical fiber with one or more connectors attached to an end. Additionally, other types of sizes and/or shapes, etc are also possible for the buffer layer or jacket. By way of example, strength members 143 are aramid fibers, fiberglass strands, or the like. Additionally, strength members 143 may also include a water-swellable component for blocking the migration of water along the assembly if desired.

Figure 5:
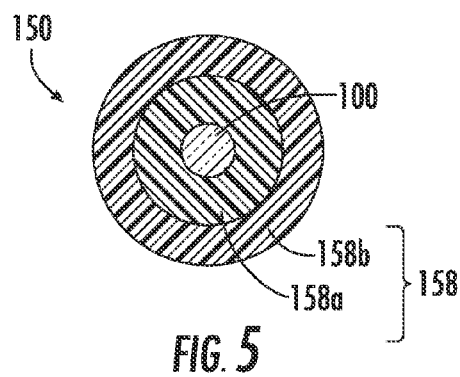

FIG. 5 depicts an another multimode fiber optic assembly 150 having a single optical fiber 100, that does not include strength members and consequently has a smaller outer diameter such as about 4 millimeters if the jacket wall thickness remains the same. Additionally, since the strength members are omitted it is possible to remove a buffer layer 158a and a jacket 158b from the fiber optic cable in a single step. Other fiber optic cables and/or other assembly designs are also possible according to the concepts disclosed.

Figure 6:
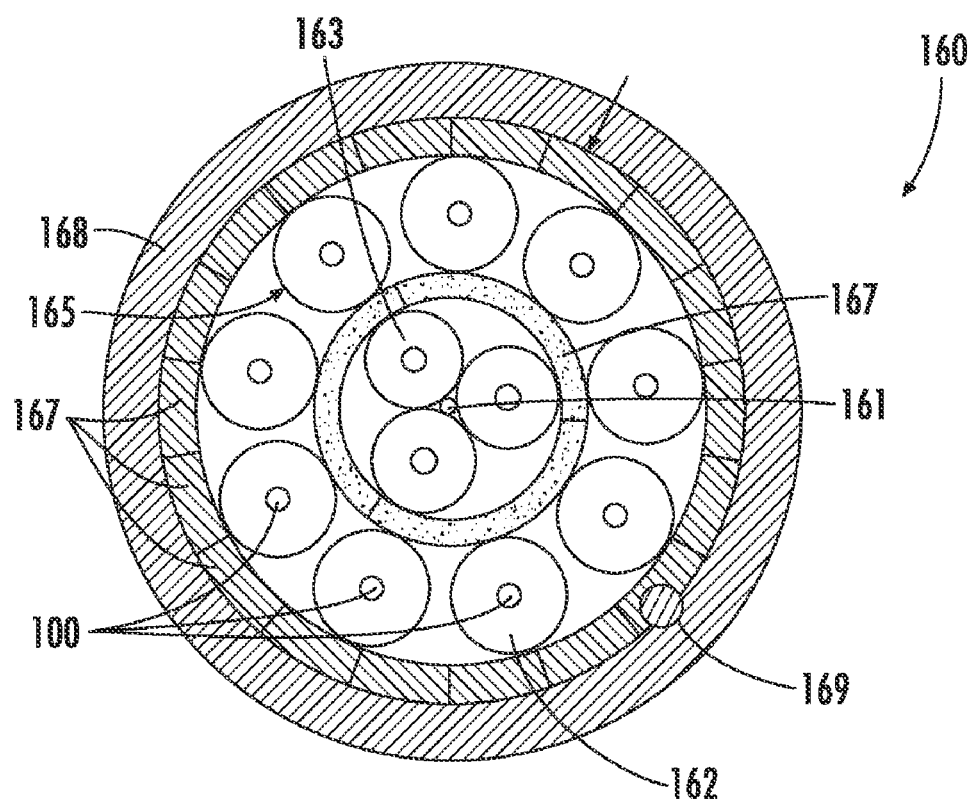

FIG. 6 depicts still another multimode fiber optic assembly 160 configured as a multifiber cable. Multimode fiber optic assembly 160 has a plurality of buffered multimode optical fibers and strength members 167 disposed within a jacket 168. Optical fibers 100 each include a respective buffer layer 162 and are arranged in two layers about a central strand 161.

Specifically, assembly 160 includes an inner layer 163 and an outer layer 165 of buffered optical fibers. Although assembly 160 depicts twelve buffered optical fibers in two layers, assemblies can have any suitable number of buffered optical fibers and/or layers. Central strand 161 provides a structure to strand inner layer 163 about, but is not required and outer layer 165 is stranded about the inner layer 163. Moreover, the different layers may be counter-helically stranded or may have other suitable stranding. Additionally, assembly 160 includes a ripcord 169 for easing removal of jacket 168.

Figure 7:
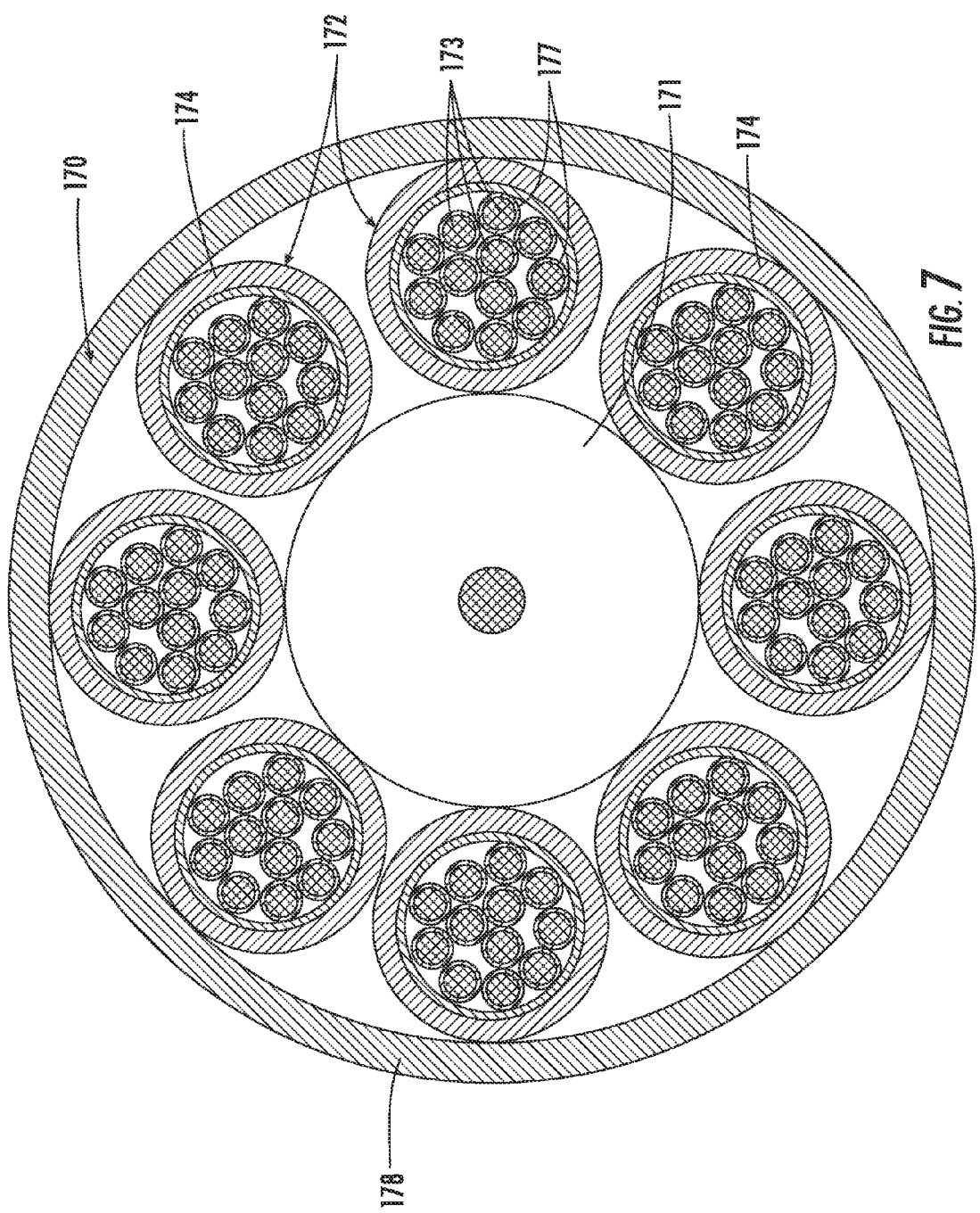
Figure 8:
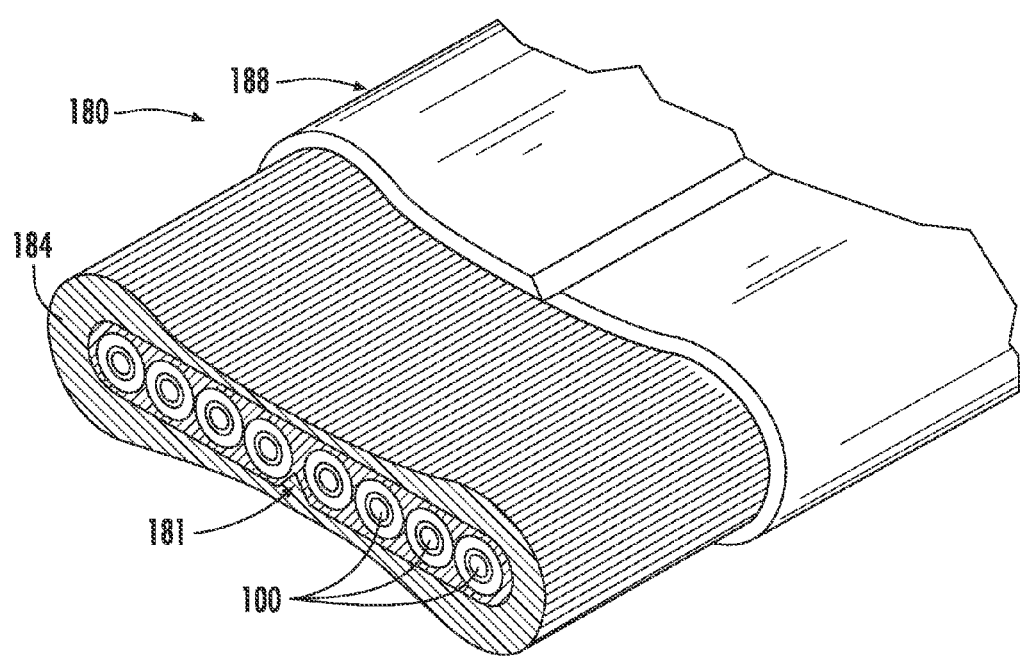

FIG. 7 depicts another multimode fiber optic assembly 170 that includes a plurality of subunits 172 stranded about a central member 171 that are disposed within a jacket 178. As depicted, each subunit 172 includes a plurality of bundles 173 within a subunit jacket 174. Each bundle 173 includes a plurality of optical fibers 100 disposed within a bundle jacket 177. If desired, assembly 170 may include strength members within bundles 173 or radially outward of bundles 173. Additionally, bundle jacket 177 and/or jacket 178 may be a thin sheath that is easily tearable by the craft with their fingers, thereby providing quick and easy access. FIG. 8 depicts a multimode fiber optic assembly 180 configured as a fiber optic ribbon cable. Assembly 180 includes a fiber optic ribbon 181 having a plurality of multimode optical fibers 100, a plurality of strength members 184, and a jacket 188. Assembly 180 can have any suitable shape and/or fiber count as with the other assemblies disclosed. Likewise, ribbon 181 can have and desired fiber count and/or structure.

Figure 9:
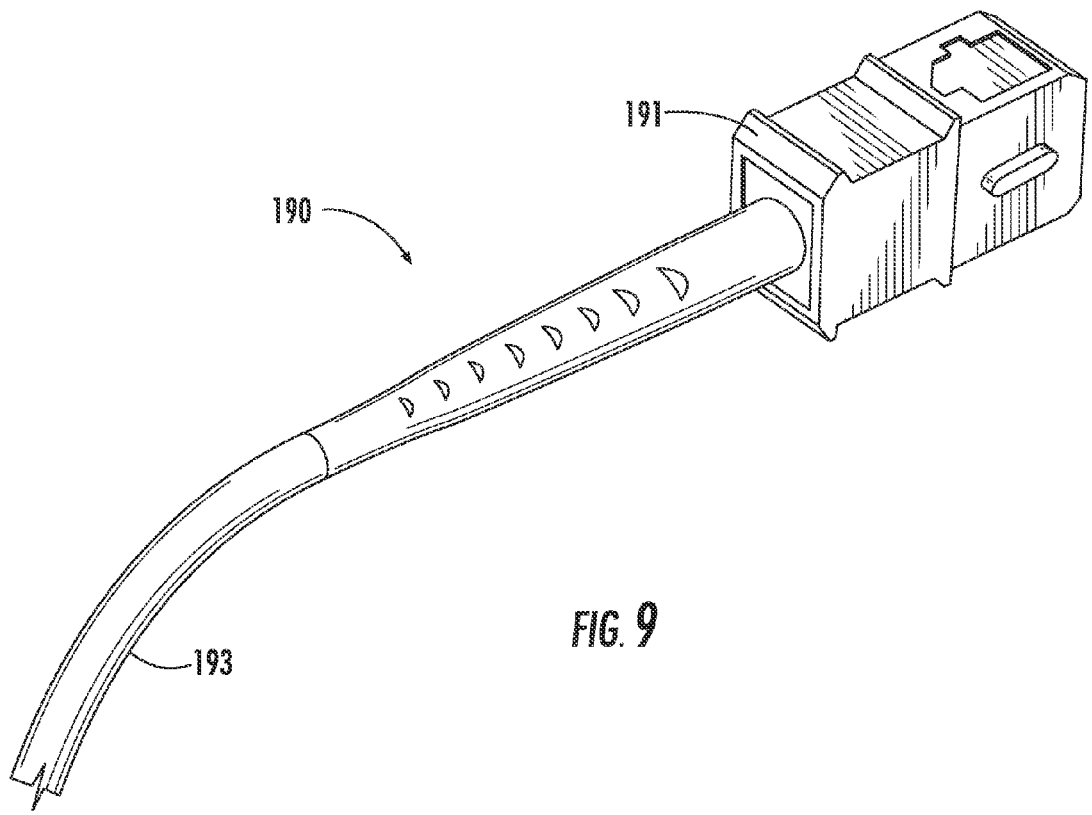
Figure 10:
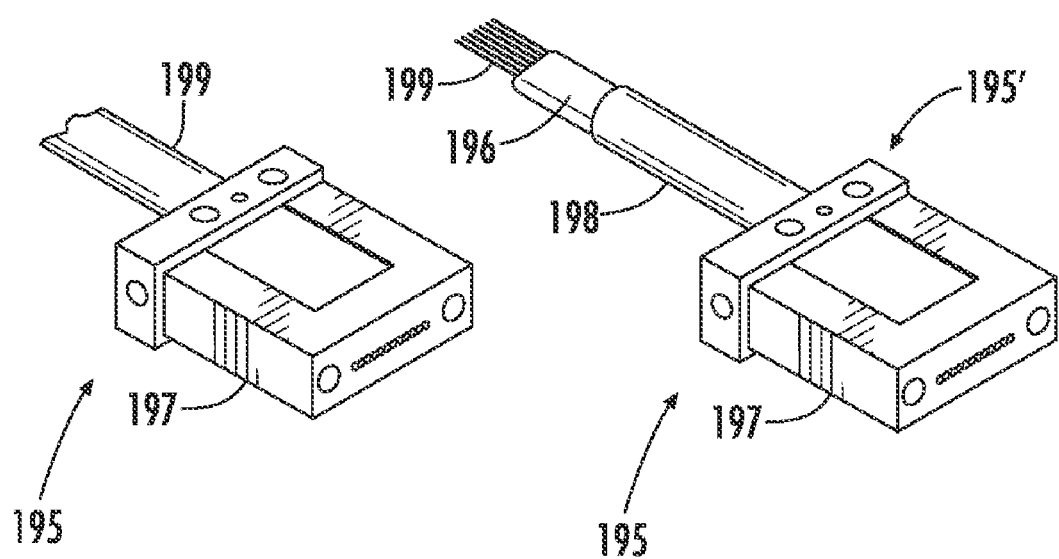

The multimode fiber optic assemblies may include any suitable fiber optic connector on one or more ends of multimode optical fiber 100 for plug and play connectivity, thereby resulting in numerous possible combinations. Illustratively, an assembly may be connectorized at one or more ends using similar or dissimilar connector types such as SC, FC, MT, MTP, MT-RJ among others. As used herein, connector means any known, or later developed, connector structure such as a connector having a ferrule, a ferrule-less connector, or simply a ferrule. Connectors have a preferably have a suitable geometry to provide a defined maximum optical fiber core offset. By way of example, the maximum optical fiber core offset is about 2 μm or less, but other values for maximum optical fiber core offset are possible such as about 1.5 μm or less, or 1 μm or less. FIG. 9 depicts a multimode fiber optic assembly 190 configured respectively as a single fiber pigtail (i.e., a connector on only one end). Specifically, multimode fiber optic assembly includes a fiber optic connector 191 attached to an end of fiber optic cable 193. FIG. 10 depicts a multimode fiber optic assemblies configured respectively as a multifiber pigtail 195 and a multifiber pigtail 195' that includes a plurality of strength members 196 and a jacket 198. Pigtails can be spliced to optical fibers in the field, thereby providing a factory polished connector for plug and play connectivity.

Figure 11:
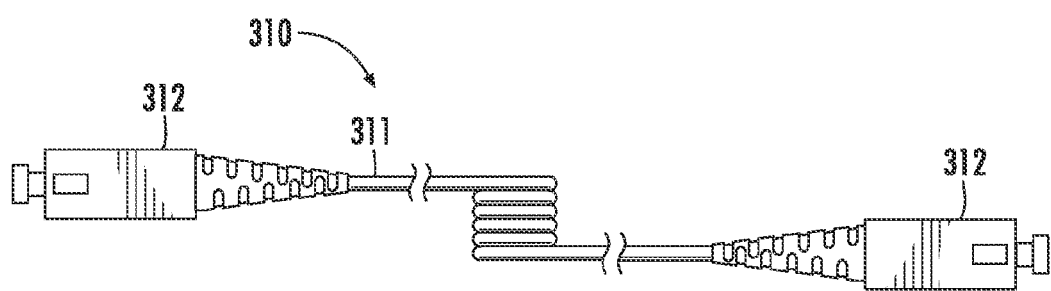
Figure 12:
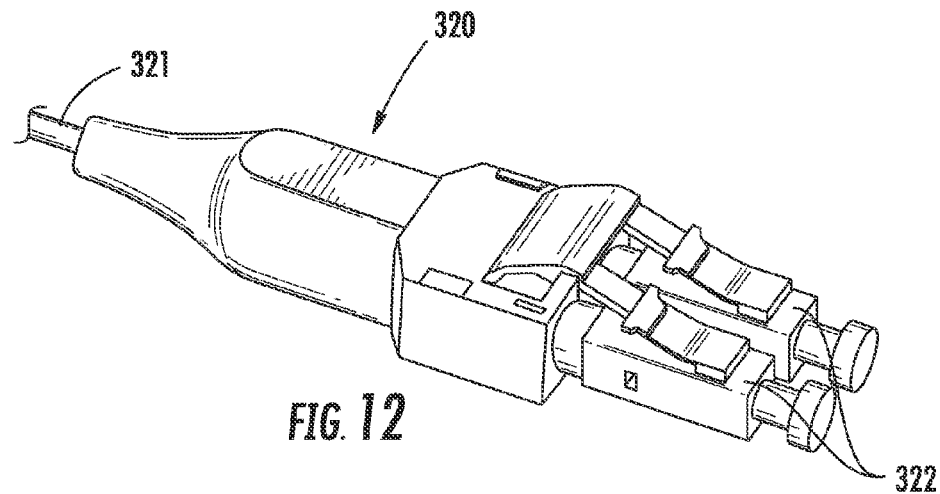
Figure 13:
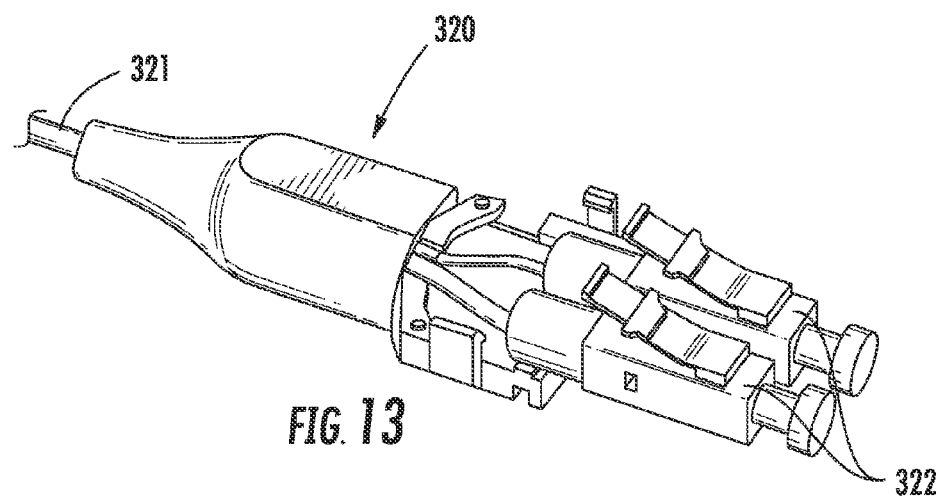

Additionally, multimode fiber optic assemblies can have a connector disposed on each end. FIG. 11 depicts an explanatory jumper assembly 310 having a connector 312 at each end of multimode optical fiber 100 disposed within a fiber optic cable 311. For instance, each end of multimode optical fiber 100 has an SC connector 12, such as available from Corning Cable Systems of Hickory, N.C. FIGS. 12 and 13 depict a multimode fiber optic assembly 320 configured as a duplex jumper assembly with duplex connectors on both ends. Specifically, fiber optic assembly 320 includes a fiber optic cable 321 having two multimode otpical fibers 100 each having a duplex connector 312 attached at each end. FIG. 13 shows assembly 320 with a portion of the duplex connector removed for clarity. As shown, duplex connector 312 includes two connectors held within the connector housing; for instance, the connectors may be LC connectors. Of course, jumper assemblies may include any length of fiber optic cable, type of connector and/or number of optical fibers capable of performing interconnections within an optical network. The multimode fiber optic assemblies have relatively low insertion loss compared with conventional multimode fiber optic assemblies. Relatively speaking, the multimode fiber optic assemblies may be aggressively bent about network structure, routing for installation, slack storage and the like without suffering appreciable delta attenuation as shown. Other fiber optic jumper assemblies are also possible according to the concepts disclosed. Still other embodiment of multimode fiber optic assemblies may include a hardened plug and/or receptacle as the connector such as an Opti-Tap or Opti-Tip available from Corning Cable Systems of Hickory, N.C.

The multimode fiber optic assemblies can have any suitable rating such as riser, plenum, general-purpose, low-smoke zero-halogen (LSZH), or the like. Likewise, any suitable type of material may be used for the protective covering (i.e., the buffer layer or jacket) such as polyurethanes (PU), polyvinylchloride (PVC), polyethylenes (PE), polyproplyenes (PP), UV curable materials, etc. depending on the desired construction and characteristics. By way of example, a multimode optical fiber 100 may include a plenum-grade buffer layer with an outer diameter of about 900 microns.

Figure 14A:
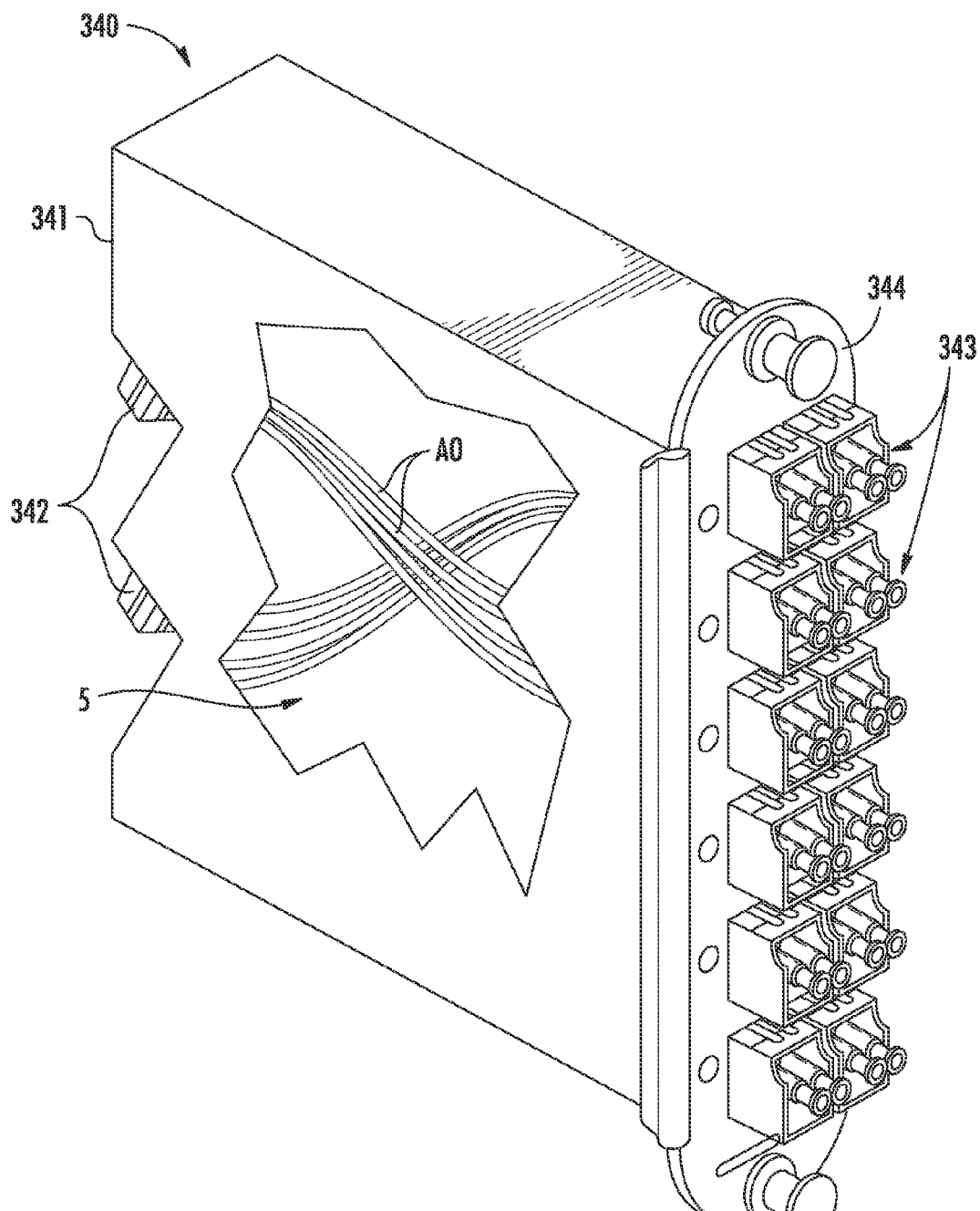
Figure 14D:
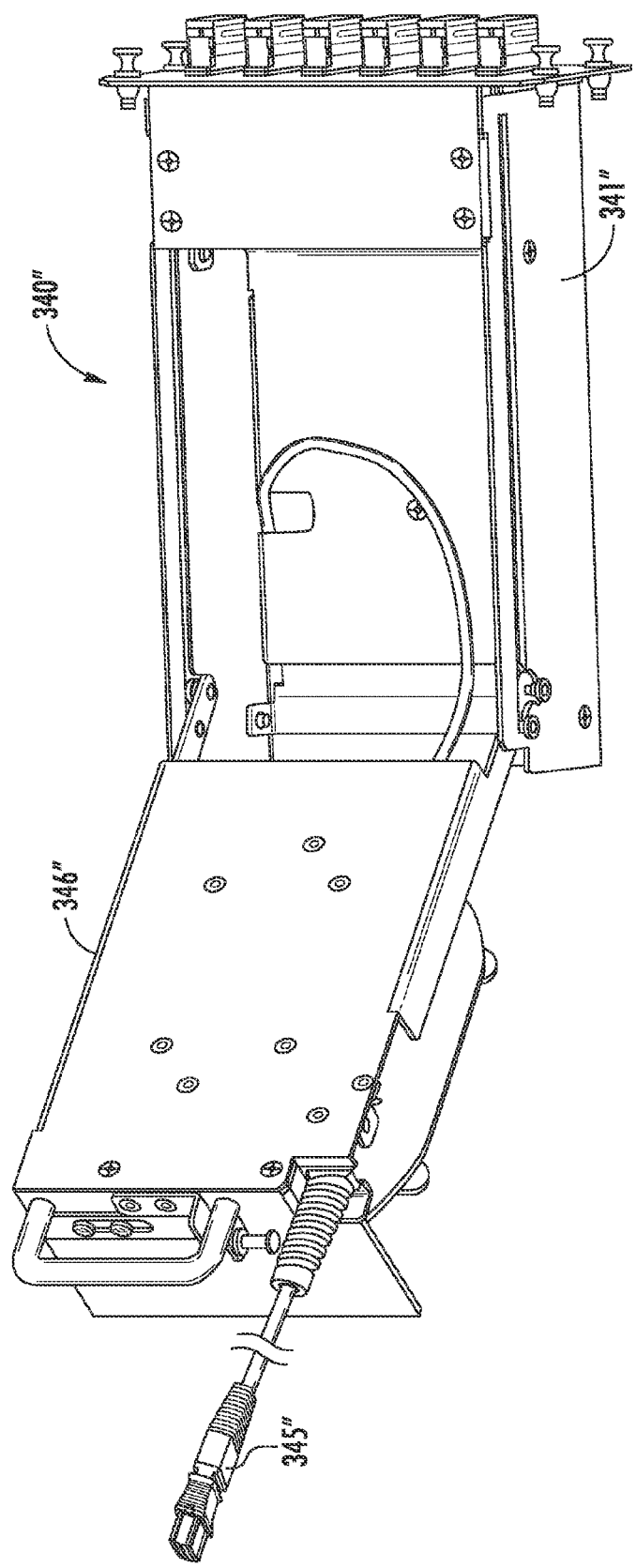

Multimode fiber optic assemblies disclosed herein may be used in other assemblies and/or configurations. For instance, FIGS. 14a-14d depicts a plurality of modules that includes one or more multimode assemblies. For instance, FIG. 14a depicts a module 340 (with a portion removed for clarity) having one or more adapters for receiving and mating a pair of fiber optic connectors. Generally speaking, module 340 includes a housing 341 with one or more adapters 342 attached at a rear portion and one or more adapters 343 attached and a front portion. More specifically, the adapters are mounted to the housing so that a portion of the adapter is disposed within a space S within housing 341. Space S includes a multimode fiber optic assembly AO having fiber optic connectors (not visible) that are plugged into adapters 342,343 inside space S. Typically, the adapter footprints are different between the front and rear portions such as one or more 12-fiber or 24-fiber adapters at the rear and duplex adapters at the front, thereby providing a patch panel for the craft. Thus, multimode fiber optic assembly AO has connectors that match the adapters of the module. Moreover, module 340 is configured with a mounting structure 344 for securing it to a shelf, rack, connector housing, or the like. FIG. 14b depicts another module 340' having a housing 341' and adapters 342' and 343' attached thereto. As depicted, module 340' has multimode fiber optic cables A1 being attached to adapters 342' from the outside. FIGS. 14c and 14d depict another module 340" that acts as an interconnection device similar to, but different than the modules discussed. Module 340" has housing 341" and a cable storage tray 346" movable between an open position and a closed position with respect to housing 341". Cable storage tray 346" can both translate and rotate as depicted. Unlike the other modules, module 340" has a multimode fiber optic assembly with a connectorized end 345" that extends beyond the module 340" and that can be tailored to the desired length by removing slack from cable storage tray 346". Other variations of modules are possible.

An encircled flux (EF) launch is used for testing the optical performance of multimode fiber optic assemblies disclosed herein. The EF launch into the core of the multimode optical fiber fills the core of the optical fiber with a specific profile (i.e., specific percentage of power within a given radii from the center of the optical fiber). More specifically, EF is determined by the near field measurement of the optical signal at the launch end of the optical fiber. The measured near field result is a function I(r), of radius, r, away from the optical center of the core, which is used to generate the EF function given by Equation (1) below.

$$EF(r) = \frac{\int_0^r xI(x)dx}{\int_0^R xI(x)dx} \quad \text{Equation (1)}$$

Figure 15:
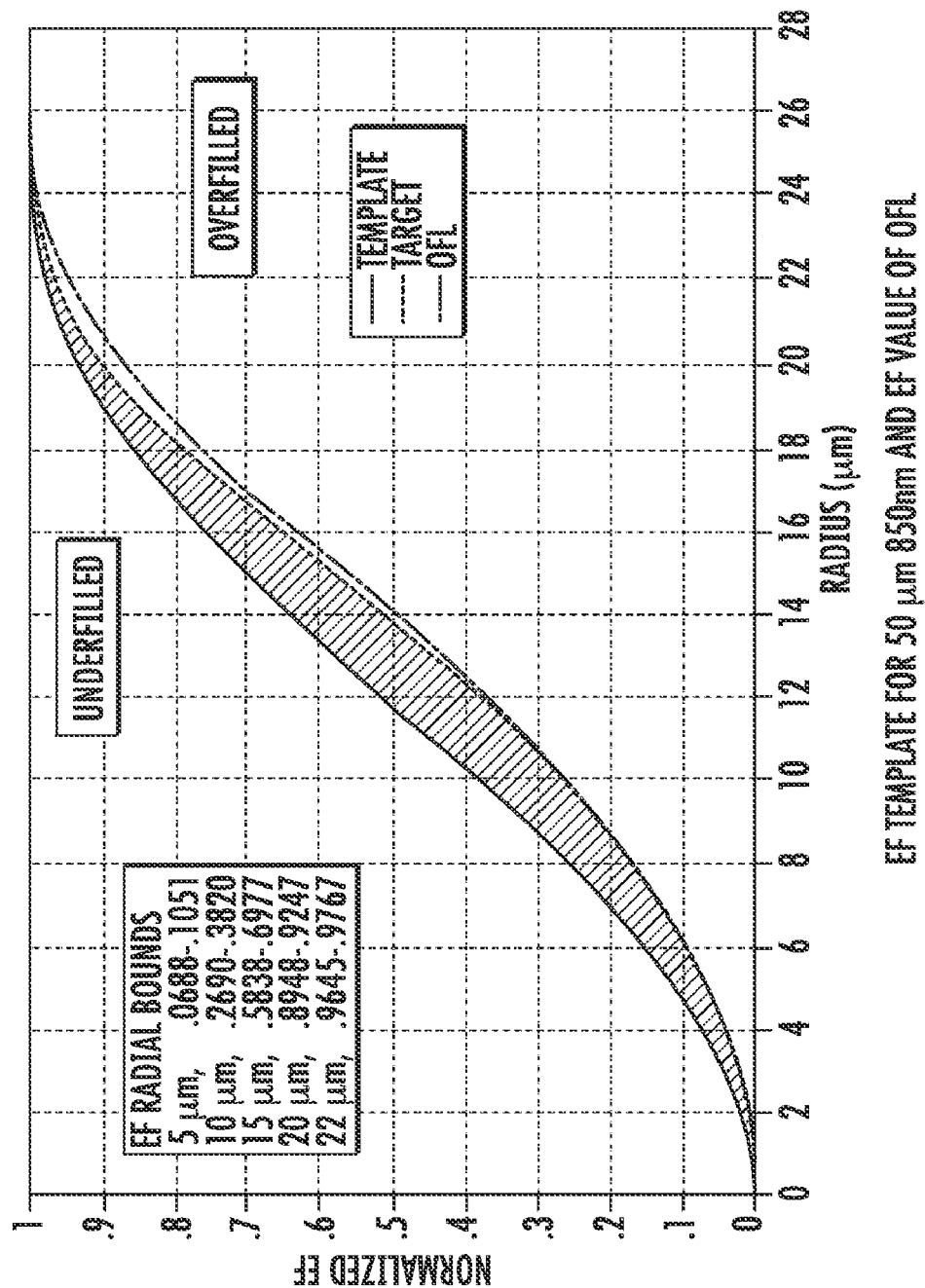
FIGS. 15 and 16 are graphical representations depicting the encircled flux (EF) launch condition for testing multimode fiber optic assemblies.
Figure 16:
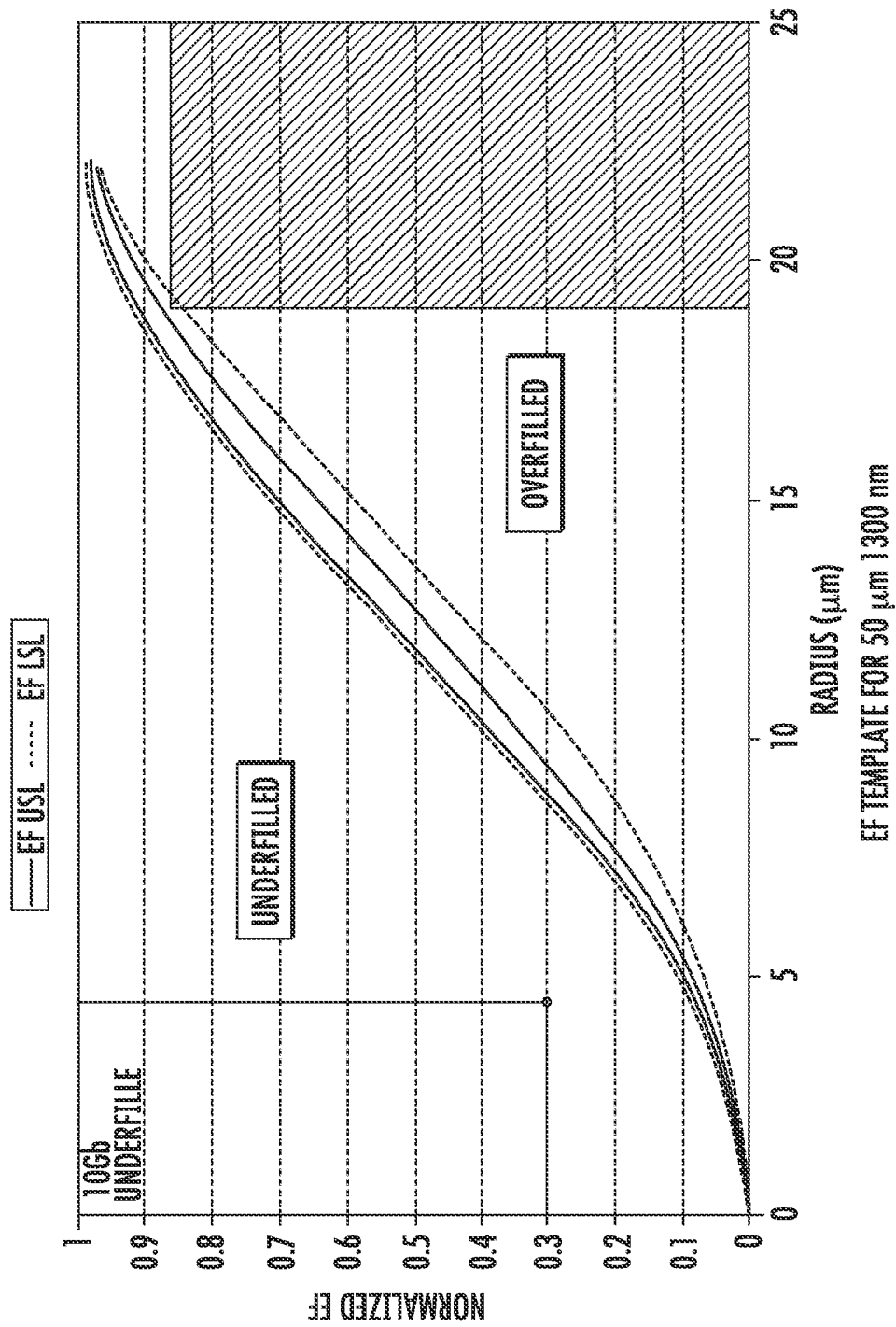

"R" is an integration limit defined as 1.15× of the nominal core radius. The EF launch is a set of particular radial control points that are defined by an EF upper limit and an EF lower limit of encircled flux values for the particular radial control points. A compliant EF launch falls within the defined upper and lower limits for the particular control points, otherwise the launch is either overfilled or underfilled. FIG. 15 is a graphical representation depicting upper and lower limits the EF launch at a reference wavelength of 850 nanometers for a multimode optical fiber with a 50 micron core along with a legend listing the EF radial bounds on the EF launch. The parameters for a compliant EF launch will vary based upon the reference wavelength and the size of the optical fiber core. FIG. 16 is a graphical representation depicting upper and lower limits the EF launch at a reference wavelength of 1300 nanometers for a multimode optical fiber with a 50 micron core. The testing discussed below uses compliant EF launches for the respective wavelengths with a 50 micron core for quantifying optical performance.

The optical performance of multimode fiber optic assemblies is surprisingly impressive compared with conventional multimode fiber optic assemblies. Testing was performed to quantify the improved performance of multimode fiber optic assemblies disclosed herein. Specifically, the performance of the multimode fiber optic assemblies were compared with conventional multimode fiber optic assemblies having a 50 micron core multimode optical fiber available from Corning, Inc. of Corning, N.Y. under the tradename InfiniCor® SX+. Different types of testing were conducted to evaluate performance under different conditions encountered by the craft. For instance, testing was conducted to determine the insertion loss of the multimode fiber optic assemblies. Insertion loss is the optical attenuation that occurs between mated fiber optic connectors and is used for determining budget losses in an optical network. For instance, the design of the optical network may allow for total insertion loss of 0.5 dB and if each mated fiber optic connector pair has an average insertion loss of 0.1 dB, then the design would be limited to a maximum of five fiber optic connector pairs to meet the loss budget for the optical network. Consequently, improved insertion loss is valuable for optical networks. Bend performance testing was also performed to determine multimode fiber optic assembly performance when wrapped into relatively small bend diameters. Preserving optical performance of multimode fiber optic assemblies during bending is advantageous since optical networks typically include many bends during routing, slack storage and the like. Moreover, preserving optical performance during bending may allow for tighter routing, increased density and/or smaller footprints for fiber optic hardware.

Insertion loss testing was performed using multimode fiber optic assemblies for comparison with conventional multimode fiber optic assemblies as discussed above. Generally speaking, multimode fiber optic assemblies have about one-half or less of the insertion loss compared with similar conventional multimode fiber optic assemblies. By way of example, multimode fiber optic assemblies disclosed herein have an insertion loss of about 0.04 dB or less per mated connector pair, which is about half of the insertion loss of a similar conventional multimode fiber optic mated pair.

Figure 17:
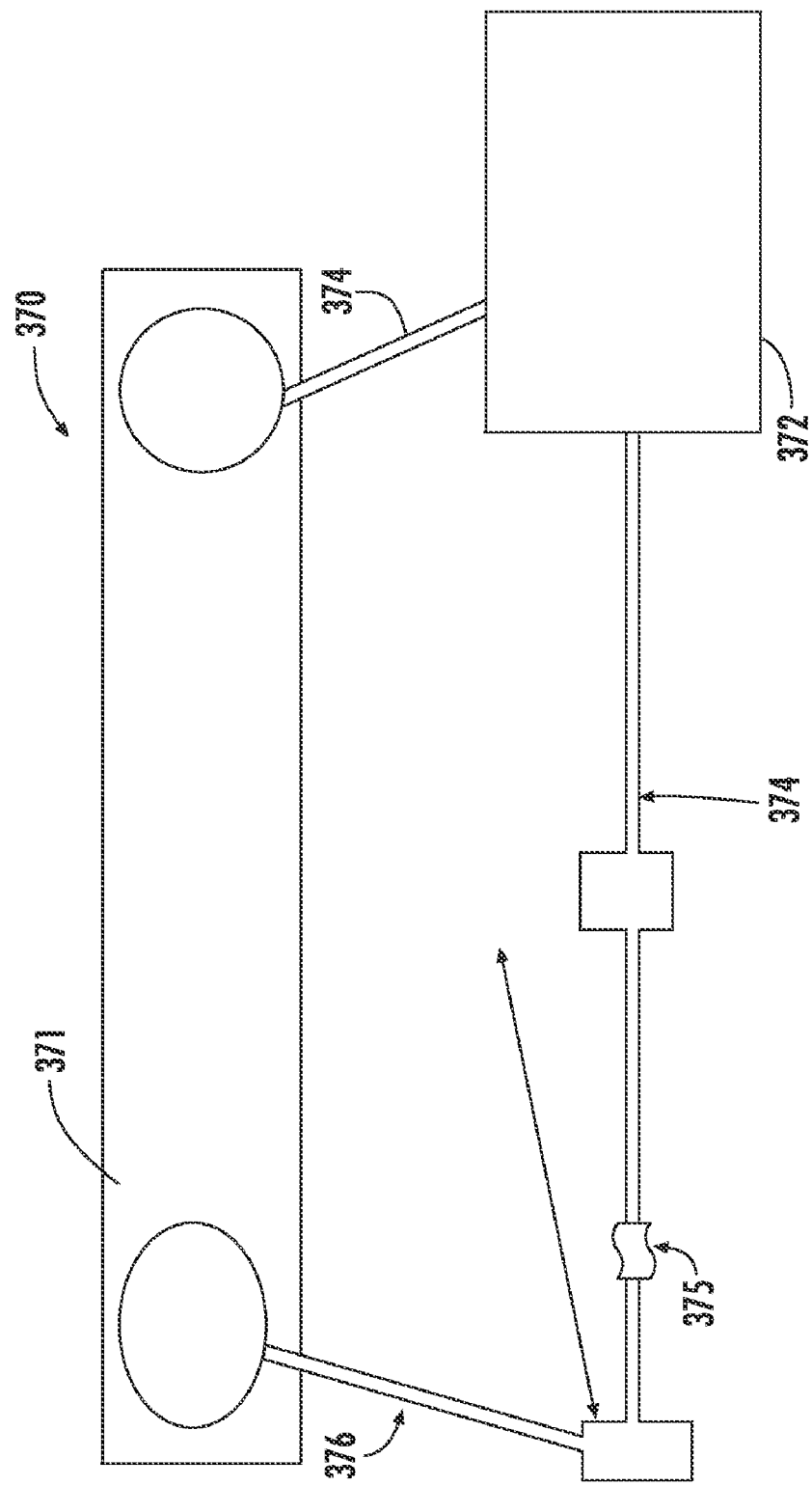
FIG. 17 is a schematic representation of the testing set-up used for determining insertion loss.

The insertion loss testing was performed using the set-up shown in FIG. 17, but other suitable set-ups are possible for measuring insertion loss as long as the proper EF launch conditions and the like are maintained. Specifically, FIG. 17 schematically illustrates insertion loss testing set-up 370. As shown, testing set-up 370 includes a source/meter 371, a mode controller 372, two reference jumpers 374, a reference jumper 375, and a test jumper 376. Specifically, source/meter 371 was a RX3000 unit available from JDS Uniphase of Milpitas, Calif. and the mode controller 372 was a MC1003 unit available from Arden Photonics, LTD. of Birmingham, England. Source/meter 371 was optically connected to mode controller 372 using a MT reference jumper 374 with a 62.5 μm core. Mode controller 372 was optically connected to reference jumper 375 having a 50 μm core. Because reference jumper 375 was connected to reference jumper 374 with the 62.5 μm core the optical output need to be checked and verified that it met the EF launch conditions for testing (i.e., remove any overfilled condition). Consequently, the end of the reference jumper 374 was connected to a MPX2 unit available from Arden Photonics to verify that the proper EF launch was inputted into the test jumper 376. After connecting the reference jumper 374 to the MPX2 unit the signal was adjusted to meet the EF launch target such as by wrapping the reference jumper 374 assembly about a mandrel for a compliant encircled flux (EF) launch. Once the EF launch was verified, reference jumper 374 was optically connected to the respective test jumpers 376 as shown to measure the insertion loss. For this particular testing, the multimode assemblies had a 12-fiber thermoplastic multifiber precision ferrules discussed below that were produced from the same mold and polished with the same procedures, thereby producing an optical fiber protrusion between about 1 to 1.4 microns. For this particular testing, the multimode fiber optic assembly had an average insertion loss of about 0.02 dB at a reference wavelength of 850 nanometers, whereas the similar conventional multimode fiber optic assembly had an average insertion loss of about 0.07 dB at the same reference wavelength. Thus, the testing revealed that this multimode fiber optic assembly had an average insertion loss that was about 28% of the insertion loss for the conventional multimode fiber optic assembly.

Figure 18:
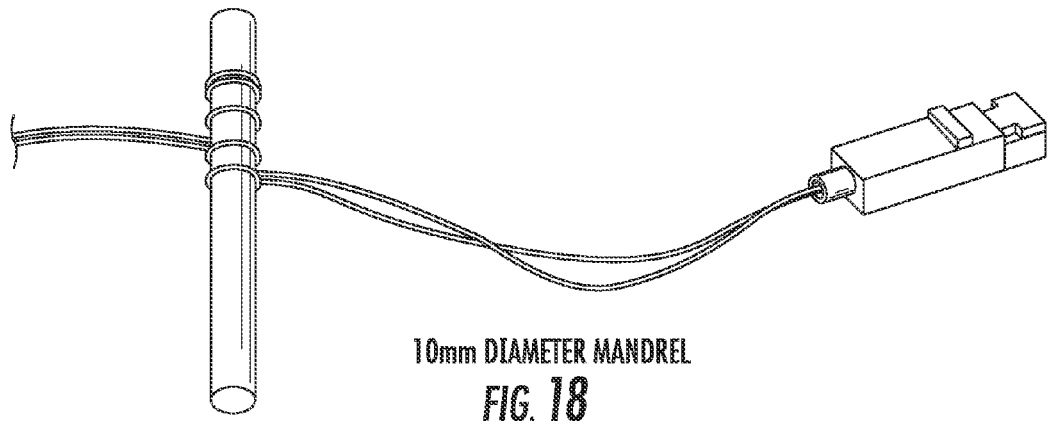
FIGS. 18-20 depict a multimode fiber optic assembly being wrapped about mandrels of various sizes.
Figure 19:
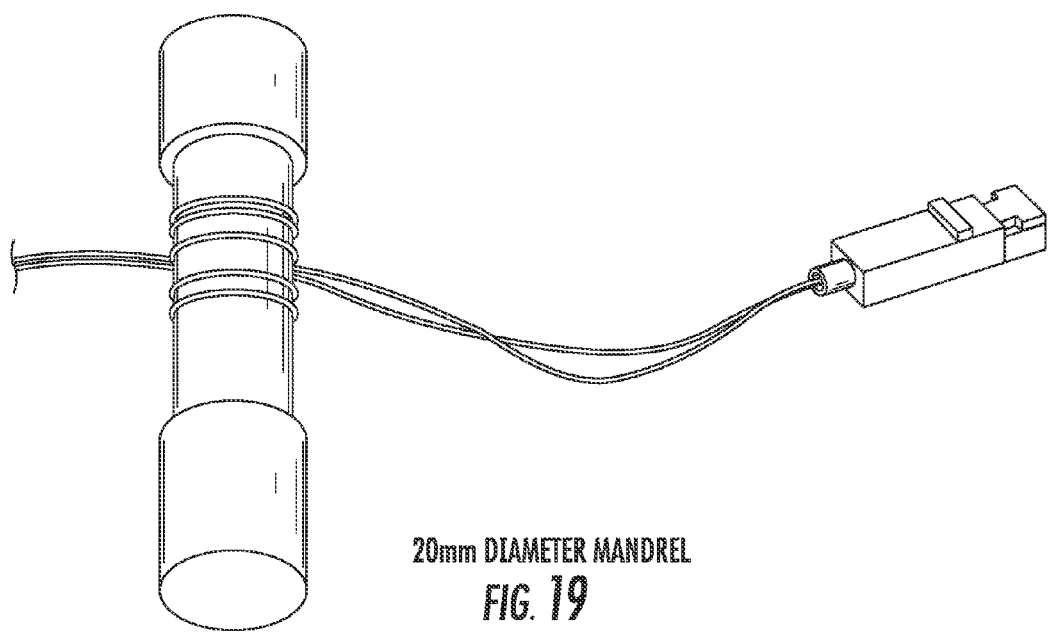
Figure 20:
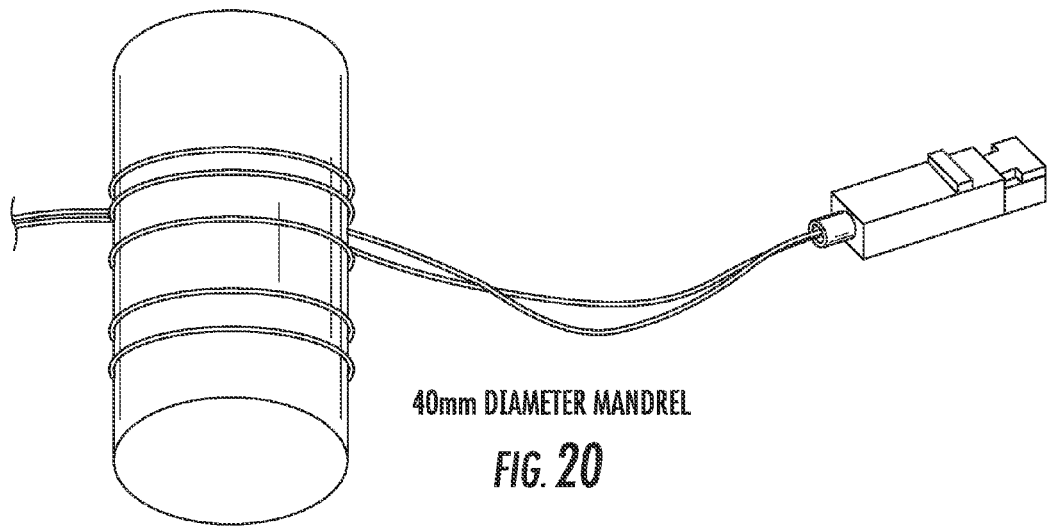

Bend performance testing was also performed for multimode fiber optic assemblies for comparison with conventional multimode fiber optic assemblies. Bend performance testing is performed by wrapping the multimode fiber optic assembly about a mandrel with a given diameter for performance comparisons with a conventional multimode fiber optic assembly. The mandrel provides a guide for bending the assembly about a structure that represents a portion of network structure about which the assembly is installed (e.g., a patch panel routing, slack storage device, routing guide, connector housing, connector port or the like). More specifically, a delta attenuation (dB) for the loss is measured after wrapping the assembly about a predetermined number of turns (i.e., each turn is about 360 degrees) about a mandrel with a given diameter. FIGS. 18-20 depict multimode fiber optic assemblies being wrapped about mandrels respectively having diameters of 10 millimeters, 20 millimeters, and 40 millimeters.

By way of example, the multimode fiber optic assemblies disclosed have an average delta attenuation of 0.20 dB or less with three turns about a 10 millimeter diameter structure at a reference wavelength of 850 nanometers. Other mandrel diameters may be used to quantify the performance of the multimode fiber optic assemblies disclosed herein. For instance, multimode fiber optic assemblies may have an average delta attenuation of 0.10 dB or less with three turns about a 20 millimeter diameter structure at a reference wavelength of 850 nanometers. Likewise, other reference wavelengths are possible for testing the performance of assemblies. Illustratively, multimode fiber optic assemblies have an average delta attenuation of 0.70 dB or less with three turns about a 10 millimeter diameter mandrel at a reference wavelength of 1310 nanometers and an average delta attenuation of 0.30 dB or less with three turns about a 20 millimeter diameter at a reference wavelength of 1310 nanometers.

One bending test was conducted on ribbonized multimode fiber optic assemblies. Specifically, similar multimode ribbon assemblies were wrapped about mandrels of predetermined sizes for comparing the performance of assemblies disclosed herein with conventional multimode assemblies. Additionally, the testing results disclosed below were performed using similar precision multifiber ferrules as discussed below for accurately aligning the cores of the respective multimode optical fibers. Tables 1 and 2 summarize an average bending delta attenuation (dB) for the tested multimode fiber optic assembly and a conventional multimode fiber optic assembly for comparison.

Table 1 lists the average bending delta attenuation test results at a reference wavelength of 850 nanometers and Table 2 lists the results at a reference wavelength of 1310 nanometers. As listed in Table 1, the conventional multimode assemblies had elevated levels of bending delta attenuation when it was wrapped about 20 millimeter and 40 millimeter diameter mandrels. Moreover, the delta attenuation for the conventional multimode assembly was so large with 10 millimeter diameter mandrel that the measurements were not taken. On the other hand, the multimode fiber optic assembly had bending delta attenuation values that were much lower compared with the conventional multimode fiber optic assembly. For instance, three turns about a 20 millimeter mandrel with a reference wavelength of 850 nanometers yielded a delta attenuation that was an order of magnitude lower than the value of the conventional multimode assembly. Likewise, a significant improvement was shown with the multimode assembly using an 40 millimeter mandrel.

TABLE 1

Average Bending Delta Attenuation at 850 nanometers

| Number of Turns | Conventional Multimode Assembly Delta Attenuation (dB) | | | Multimode Assembly Delta Attenuation (dB) | | |
|---|---|---|---|---|---|---|
| | 10 mm Mandrel | 20 mm mandrel | 40 mm Mandrel | 10 mm Mandrel | 20 mm Mandrel | 40 mm Mandrel |
| 3 | — | 0.97 | 0.20 | 0.09 | 0.01 | 0.01 |

As depicted in Table 2, the conventional multimode assemblies had elevated levels of bending delta attenuation when it was wrapped about 20 millimeter and 40 millimeter diameter mandrels. Moreover, the bending delta attenuation for the conventional multimode assembly was so large with 10 millimeter diameter mandrel that the measurements were not taken. On the other hand, the multimode fiber optic assembly had bending delta attenuation values that were much lower compared with the conventional multimode fiber optic assembly. For instance, three turns about a 20 millimeter mandrel with a reference wavelength of 1310 nanometers yielded a bending delta attenuation that was about one-sixth of the value of the conventional multimode assembly. Likewise, a similar improvement was shown with the multimode assembly using a 40 millimeter mandrel. Thus, the multimode fiber optic assemblies disclosed herein advantageously preserve optical performance allowing more rugged installations and/or lower loss budgets in the optical network.

TABLE 2

Average Bending Delta Attenuation at 1310 nanometers

| Number of Turns | Conventional Multimode Assembly Delta Attenuation (dB) | | | Multimode Assembly Delta Attenuation (dB) | | |
|---|---|---|---|---|---|---|
| | 10 mm Mandrel | 20 mm mandrel | 40 mm Mandrel | 10 mm Mandrel | 20 mm mandrel | 40 mm Mandrel |
| 3 | — | 1.21 | 0.29 | 0.63 | 0.17 | 0.05 |

Figure 21:
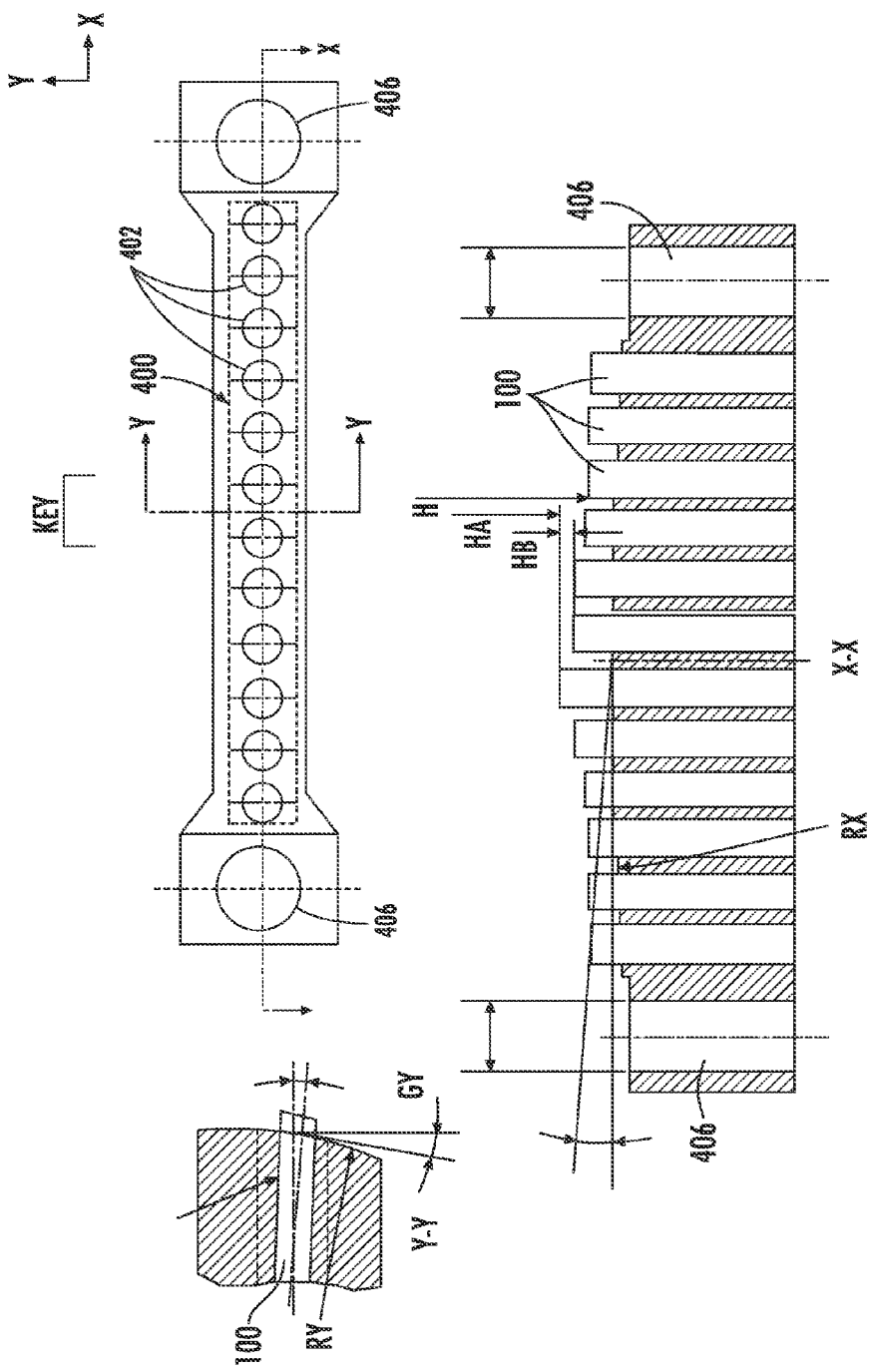
FIG. 21-23 are schematic representations of a multifiber ferrule showing geometry.
Figure 22:
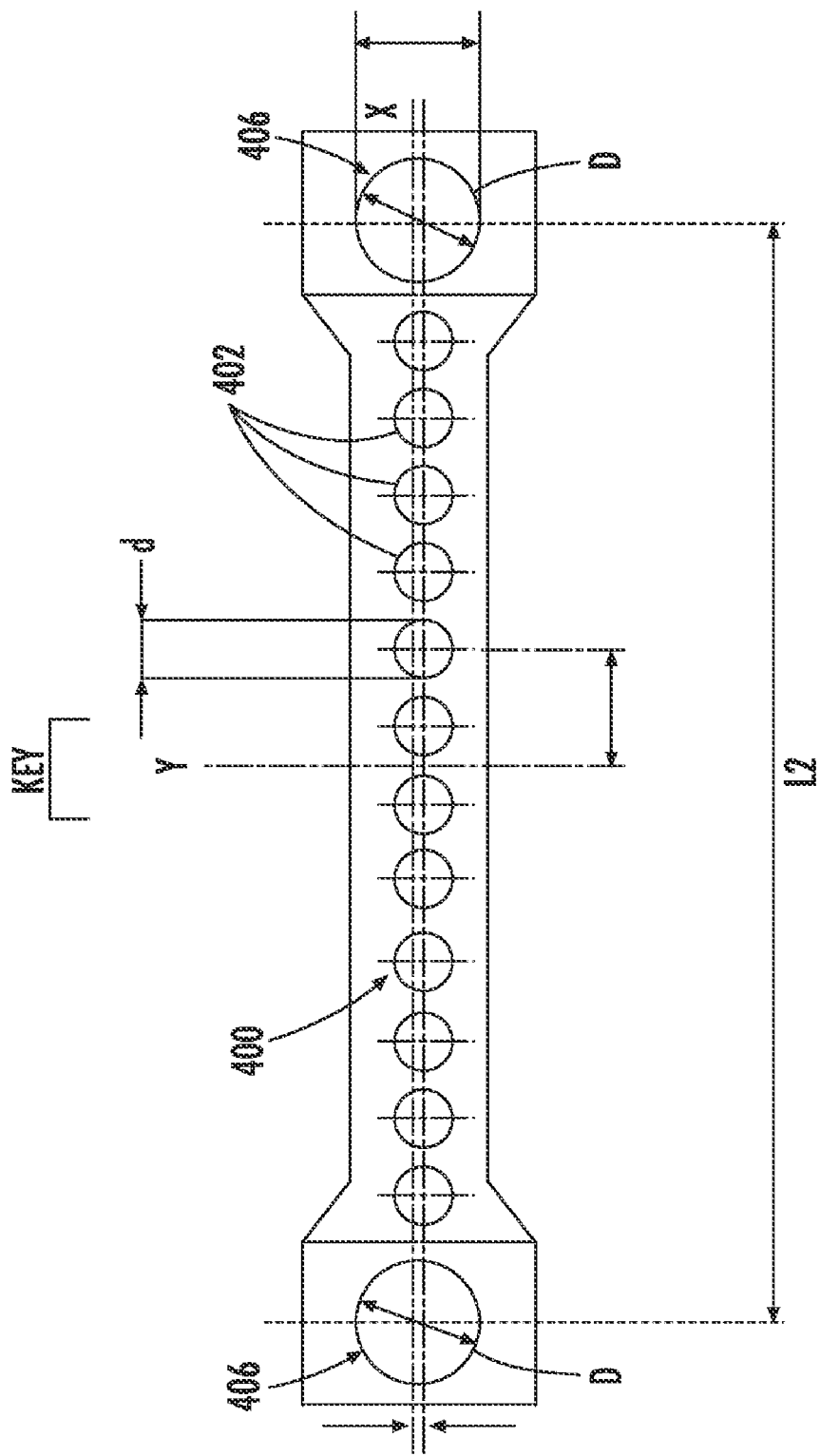
Figure 23:
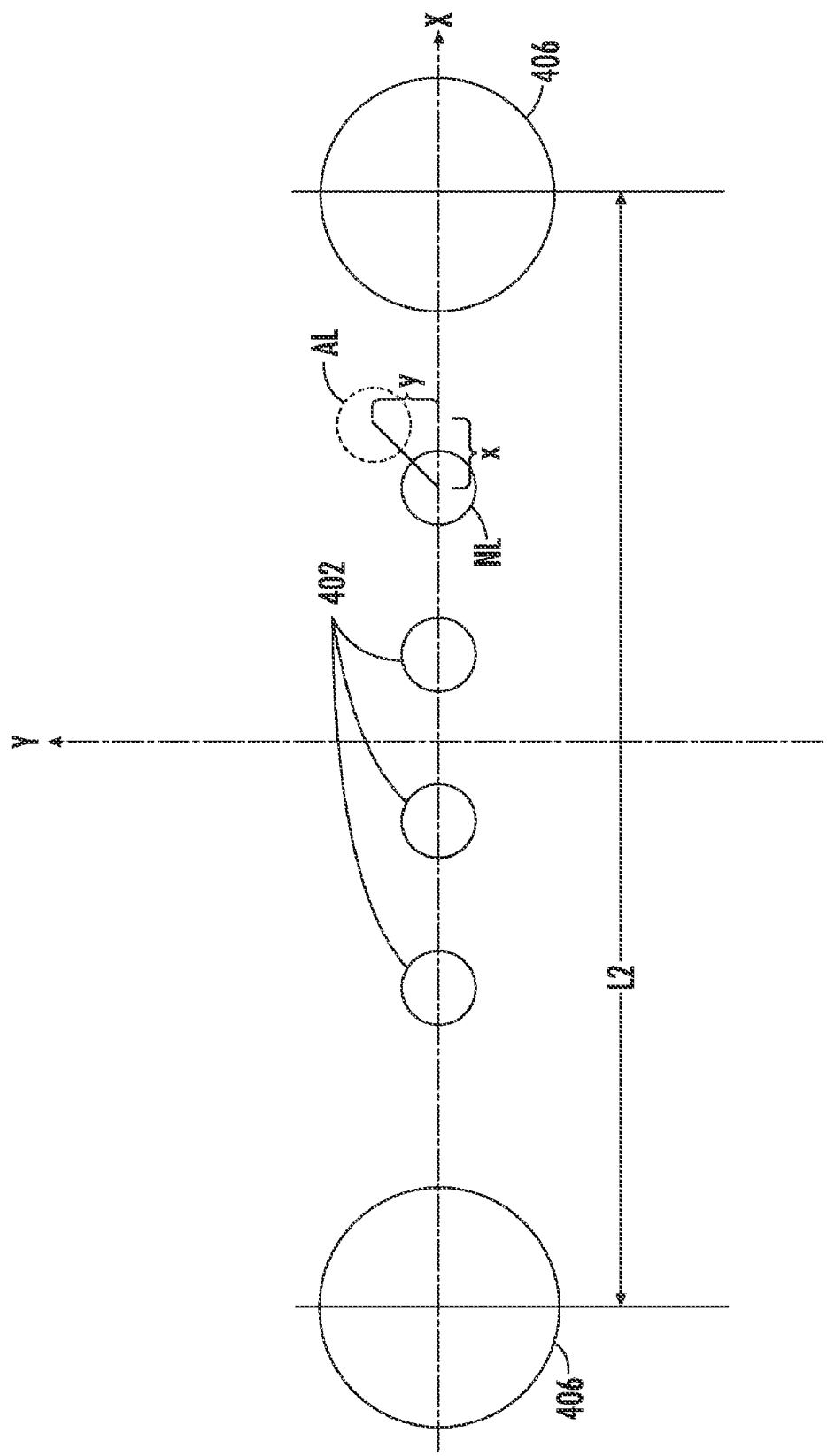

Realizing the full optical performance potential of assemblies using a multi-fiber ferrule requires the use of a precision multi-fiber ferrule. Simply stated, the precision multimode multi-fiber ferrule disclosed herein has tighter tolerances for mating optical fibers, thereby inhibiting tolerance stack-up among the optical fiber bores that may degrade optical performance when mating with a complimentary multi-fiber ferrule. FIGS. 21-23 are schematic representations of geometry for a typical multifiber ferrule. Specifically, FIG. 21 schematically depicts the mating endface of a multifiber ferrule along with cross-sections in the X-X and Y-Y planes. FIGS. 22 and 23 schematically depict the mating endface and dimensions thereof.

FIG. 21 shows an endface 400 of the multifiber ferrule with a plurality of fiber bores 402 aligned in an array between a pair of guide pin bores 406. The cross-section of FIG. 21 in the X-X plane (lower) shows optical fibers 100 disposed in fiber bores 402. As shown, optical fibers 100 protrude by a height H beyond the endface of the multifiber ferrule. As shown, a first height delta HA is a height difference between the shortest optical fiber protrusion and the longest optical fiber protrusion. Also shown is a second height delta HB, which is the largest difference in height between two adjacent optical fibers. The X-X plane (lower) depicts the geometry for determining the co-planarity of a multifiber ferrule. As known in the art, co-planarity is the sum of the deviation of the longest protruding optical fiber plus the deviation of the shortest protruding optical fiber from a least fit square line fitted to the optical fiber protrusion profile for the given finished multifiber ferrule assembly. By way of example, precision multifiber ferrules for use with optical fibers have a co-planarity of about 300 nanometers or less, and more preferably 200 nanometers or less. In other embodiments, the co-planarity is about 175 nanometers or less and in further embodiments the co-planarity is about 150 nanometers or less.

FIG. 22 depicts the endface 400 of the multifiber ferrule along with dimensions related to fiber bores 402 and guide pin bores 406. The origin of the X-Y axis is located between the center fiber bores at a ferrule mating center. Guide pin bores 406 have a nominal diameter D and fiber bores 402 have a nominal diameter d as shown. The guide pin bores 406 and the fiber bores 402 have inherent manufacturing tolerances that may affect alignment of the fiber bore array. The tolerance of the guide pins bores allows misalignment between the array of fiber bores 402 therebetween (i.e., movement of the entire array). The precision multifiber ferrules disclosed herein have specified tolerance for preserving optical performance by inhibiting insertion loss. In one embodiment, the guide pin bores have a tolerance of ±0.0007 millimeters or less from the nominal diameter D. By way of example, the guide pin bore has a nominal diameter D of 0.6995 millimeters with a tolerance of about ±0.0005 millimeters or less from the nominal diameter D. In other embodiments, the guide pin bores can have a tolerance of ±0.0003 millimeters or less from the nominal diameter D.

Further, a distance L2 is defined as the distance between the centers of the two guide pin bores 406 and can affect insertion loss. In one embodiment, the distance L2 has a tolerance of ±0.0007 millimeters or less from the nominal distance. By way of example, the nominal distance L2 is 4.6000 millimeters with a tolerance of about ±0.0005 millimeters or less from the nominal distance. In other embodiments, the distance L2 has a tolerance of ±0.0003 millimeters or less from the nominal distance.

As shown in FIG. 22, fiber bores can have an offset from a desired location. Specifically, a radial offset r of the fiber bores 402 can also cause misalignment of the relatively large multimode optical fiber cores, thereby allowing insertion loss due to misalignment. FIG. 23 is a simplified schematic view of the multifiber ferrule (i.e., some of the optical fiber bores 402 are removed for clarity) showing the radial offset r of a representative optical fiber bore 402. More specifically, FIG. 23 shows a nominal optical fiber bore location NL as a solid circle and an actual optical fiber bore location AL as a dashed circle. In other words, each optical fiber bore has a nominal X-Y location from the ferrule mating center and each respective bore has a variance from this nominal X-Y location. Thus, the radial offset r can be determined using right triangle geometry using the X and Y variances from the nominal fiber bore location as shown. In one embodiment, a maximum radial offset r of any individual optical fiber bore of the array is within ±0.0015 millimeters from a nominal optical fiber bore location. By way of example, the maximum radial offset r of any individual optical fiber bore of the array is within ±0.0010 millimeters from a nominal optical fiber bore location. In other embodiments, the maximum radial offset r of any individual optical fiber bore of the array is within ±0.00075 millimeters from a nominal optical fiber bore location.

The foregoing is a description of various embodiments that are given here by way of example only. Although multimode fiber optic cables assemblies including bend performance fiber in at least a portion thereof have been described with reference to preferred embodiments and examples thereof, other embodiments and examples may perform similar functions and/or achieve similar results. All such equivalent embodiments and examples are within the spirit and scope of the disclosure and are intended to be covered by the appended claims.

We claim:

1. A multimode fiber optic assembly, comprising:
    at least one multimode optical fiber comprising a core region and a cladding region surrounding the core region; and
    at least one connector mounted upon an end of the at least one multimode optical fiber, wherein the assembly has an insertion loss of about 0.04 dB or less at a reference wavelength of 850 nanometers.

2. The assembly of claim 1, wherein the assembly has an average bending delta attenuation of 0.20 dB or less with 3 turns about a 10 millimeter diameter structure at a reference wavelength of 850 nanometers.

3. The assembly of claim 1, wherein the assembly has an average bending delta attenuation of 0.70 dB or less with 3 turns about a 10 millimeter diameter structure at a reference wavelength of 1310 nanometers.

4. The assembly of claim 1, wherein the assembly has an average bending delta attenuation of 0.10 dB or less with 3 turns about a 20 millimeter diameter structure at a reference wavelength of 850 nanometers.

5. The assembly of claim 1, wherein the assembly has an average bending delta attenuation of 0.30 dB or less with 3 turns about a 20 millimeter diameter at a reference wavelength of 1310 nanometers.

6. The assembly of claim 1, wherein the assembly includes a hardened fiber optic connector.

7. The assembly of claim 1, wherein the assembly is a portion of a module.

8. The assembly of claim 1, wherein the assembly is selected from the group of a module, a simplex fiber optic jumper, a duplex fiber optic jumper, a jumper assembly, and a pigtail.

9. The assembly of claim 1, wherein the assembly includes a multifiber ferrule.

10. The assembly of claim 9, wherein the multifiber ferrule has an average co-planarity of 200 nanometers or less.

11. The assembly of claim 9, wherein the multifiber ferrule has a pair of guide pin bores having a nominal diameter, wherein the guide pin bores have a tolerance of ±0.0005 millimeters from a nominal diameter.

12. The assembly of claim 9, wherein the multifiber ferrule has a plurality of optical fiber bores arranged in a linear array between a pair of guide pin bores, wherein a maximum radial offset of any individual optical fiber bore is within ±0.001 millimeters from a nominal optical fiber bore location.

13. The assembly of claim 1, wherein the at least one connector has a maximum optical fiber core offset is about 2 μm or less.

14. A multimode jumper assembly, the assembly comprising:
    at least one multimode optical fiber having a first end and a second end;
    a protective covering surrounding at least a portion of the at least one bend performance optical fiber;
    a first connector and a second connector respectively mounted upon the first end and second end of the multimode optical fiber, wherein the assembly has an insertion loss of about 0.04 dB or less at a reference wavelength of 850 nanometers.

15. The assembly of claim 14, wherein the assembly has an average bending delta attenuation of 0.20 dB or less with 3 turns about a 10 millimeter diameter structure at a reference wavelength of 850 nanometers.

16. The assembly of claim 14, wherein the assembly has an average bending delta attenuation of 0.70 dB or less with 3 turns about a 10 millimeter diameter structure at a reference wavelength of 1310 nanometers.

17. The assembly of claim 14, wherein the assembly has an average bending delta attenuation of 0.10 dB or less with 3 turns about a 20 millimeter diameter structure at a reference wavelength of 850 nanometers.

18. The assembly of claim 14, wherein the assembly has an average bending delta attenuation of 0.30 dB or less with 3 turns about a 20 millimeter diameter at a reference wavelength of 1310 nanometers.

19. The assembly of claim 14, wherein the assembly includes a hardened fiber optic connector.

20. The assembly of claim 14, wherein the assembly is a portion of a module.

21. The assembly of claim 14, wherein the assembly is selected from the group of a module, a simplex fiber optic jumper, a duplex fiber optic jumper, a jumper assembly, and a pigtail.

22. The assembly of claim 14, wherein the assembly includes a multifiber ferrule.

23. The assembly of claim 22, wherein the multifiber ferrule has an average co-planarity of 200 nanometers or less.

24. The assembly of claim 22, wherein the multifiber ferrule has a pair of guide pin bores having a nominal diameter, wherein the guide pin bores have a tolerance of ±0.0005 millimeters from a nominal diameter.

25. The assembly of claim 22, wherein the multifiber ferrule has a plurality of optical fiber bores arranged in a linear array between a pair of guide pin bores, wherein a maximum radial offset of any individual optical fiber bore is within ±0.001 millimeters from a nominal optical fiber bore location.

26. The assembly of claim 14, wherein the first connector and the second connector have a maximum optical fiber core offset of about 2 μm or less.

27. A fiber optic assembly, the assembly comprising:
 a plurality of multimode optical fibers having a first end and a second end; and
 a multifiber ferrule attached to the plurality of multimode optical fibers, wherein the multifiber ferrule has a pair of guide pin bores having a nominal diameter, wherein the guide pin bores have a tolerance of ±0.0005 millimeters from a nominal diameter.

28. The assembly of claim 27, wherein the assembly has an average delta attenuation of 0.20 dB or less with 3 turns about a 10 millimeter diameter structure at a reference wavelength of 850 nanometers.

29. The assembly of claim 27, wherein the assembly has an average delta attenuation of 0.70 dB or less with 3 turns about a 10 millimeter diameter structure at a reference wavelength of 1310 nanometers.

30. The assembly of claim 27, wherein the assembly has an average delta attenuation of 0.10 dB or less with 3 turns about a 20 millimeter diameter structure at a reference wavelength of 850 nanometers.

31. The assembly of claim 27, wherein the assembly has an average delta attenuation of 0.30 dB or less with 3 turns about a 20 millimeter diameter at a reference wavelength of 1310 nanometers.

32. The assembly of claim 27, wherein the assembly includes a hardened fiber optic connector.

33. The assembly of claim 27, wherein the assembly is selected from the group of a jumper assembly and a pigtail.

34. The assembly of claim 27, wherein the multifiber ferrule has an average co-planarity of 200 nanometers or less.

35. The assembly of claim 27, wherein the multifiber ferrule has a plurality of optical fiber bores arranged in a linear array between a pair of guide pin bores, wherein a maximum radial offset of any individual optical fiber bore is within ±0.001 millimeters from a nominal optical fiber bore location.

* * * * *